United States Patent [19]

Hirata et al.

[11] Patent Number: 5,946,142
[45] Date of Patent: *Aug. 31, 1999

[54] PROJECTION LENS SYSTEM AND PROJECTION IMAGE DISPLAY APPARATUS USING THE SAME

[75] Inventors: Koji Hirata, Yokohama; Naoyuki Ogura, Ebina; Shigeru Mori, Chigasaki; Takahiro Yoshida, Miura; Kazunari Nakagawa, Ebina, all of Japan

[73] Assignee: Hitachi Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,649

[22] Filed: Dec. 11, 1996

[30] Foreign Application Priority Data

Dec. 11, 1995 [JP] Japan ................................. 7-321430
May 20, 1996 [JP] Japan ................................. 8-124330

[51] Int. Cl.$^6$ ........................ G02B 3/00; G02B 3/02; H04N 5/74
[52] U.S. Cl. ..................... 359/649; 359/713; 348/781
[58] Field of Search ................................. 359/649, 650, 359/651, 756, 763, 755, 648, 708, 713, 754; 348/781

[56] References Cited

U.S. PATENT DOCUMENTS

| | | | |
|---|---|---|---|
| 4,682,862 | 7/1987 | Moskovich | 359/649 |
| 4,963,007 | 10/1990 | Moskovich | 359/649 |
| 5,272,540 | 12/1993 | Hirata et al. | 348/781 |
| 5,296,967 | 3/1994 | Moskovich | 359/649 |
| 5,329,363 | 7/1994 | Moskovich | 359/649 |
| 5,404,246 | 4/1995 | Kaneko et al. | 359/649 |
| 5,475,534 | 12/1995 | Okajima et al. | 359/649 |

FOREIGN PATENT DOCUMENTS

| | | |
|---|---|---|
| 2-51478 | 4/1990 | Japan . |
| 3-137610 | 6/1991 | Japan . |
| 4-5608 | 1/1992 | Japan . |

*Primary Examiner*—Georgia Epps
*Assistant Examiner*—Jordan M. Schwartz
*Attorney, Agent, or Firm*—Evenson McKeown Edwards & Lenahan, PLLC

[57] ABSTRACT

When a projection lens system used for a rear projection type image display apparatus has a first lens group having an aspherical lens surface, a second lens group, a third lens group sharing almost all the positive refractive power of the overall system, a fourth lens group having an aspherical lens surface, a fifth lens group, and a sixth lens group including a lens having a profile of aspherical surface in which the concave surface thereof faces the screen side and the refractive power in the marginal area is weaker than the refractive power around the optical axis, a projection lens system having a large aperture ratio (low F-number), high focus, wide field angle, and sufficient marginal light amount ratio can be realized at a low cost. When a predetermined opening portion is formed in the projection lens and lens barrel, the lens elements are cooled by air suction and exhaust and the lowering of the lens performance due to temperature change can be prevented. When a flange is arranged in a suitable location of the opening portion, entry of a foreign material from the opening portion and light leakage from the inside are prevented and the contrast performance of the projection type image display apparatus can be prevented from lowering.

11 Claims, 24 Drawing Sheets

PROJECTION LENS SYSTEM AND PROJECTION IMAGE DISPLAY APPARATUS USING THE SAME

BACKGROUND OF THE INVENTION

The present invention relates to a projection lens system and particularly to a projection lens system with a wide field angle which provides a bright image having an excellent focus performance even in the marginal area, uses an inexpensive glass material, and has a short projection distance and a projection image display apparatus using the system which is excellent in cost performance.

Recently, a television set as an image display apparatus for home use is proceeding to a larger screen size as the wide aspect ratio increases. As an image display apparatus for home use, there are two types available such as a direct view type using a cathode ray tube and a so-called projection type for enlarging and projecting an image on a miniature projection tube whose screen size is about 7 inch of diagonal on the screen by a projection lens system. However, due to restrictions to compactness and weight of a TV set, for a screen size of more than about 37 inch of diagonal, a projection image display apparatus is mainly used.

At first, this projection image display apparatus was inferior to the direct view type in screen brightness and focus performance. However, recently, the performance of each of the components such as the projection lens system, screen, and projection tube is improved, so that both the screen brightness and focus performance are approaching those of the direct view type. In the performance improvement process of the projection image display apparatus, various arts have been developed in the projection lens system which is a key device. Firstly, at the first step of development, to obtain screen brightness equivalent to that of the direct view type or higher, as disclosed in U.S. Pat. No. 4,682,862, reduction of the F-number has been tried by using many plastic aspherical lens elements.

Next, at the second step, a projection lens system for realizing improvement of screen brightness and improvement of focus performance at the same time has been developed. With respect to this projection lens system, as disclosed in Japanese Patent Application Laid-Open No. 3-137610, there is an example using a plastic aspherical lens and a doublet glass lens. As a result, in the current projection TV set, a projection lens system having an F-number of about f/1.1 is used and both brightness and focus performance are improved on the whole screen.

At the third step, a projection lens system with a wide field angle by which a compact set dimension can be realized on account of the short projection distance has been developed mainly. A reference describing an actual art for realizing a projection lens system with a wide field angle without reducing the brightness and focus performance in the marginal area and an actual projection lens system is disclosed in Japanese Patent Application Laid-Open No. 4-5608. Hereinafter, the art disclosed in this patent is referred to as a first prior art.

In this first prior art, by combining plastic aspherical lens elements and glass lens elements effectively in a projection lens system of six lens groups, the aforementioned problem is solved. Furthermore, the projection lens system is structured so that almost all the positive refractive power of the projection lens system is shared by the glass lenses and the plastic aspherical lens elements have little refractive power, so that the peculiar drift of the focus performance due to a temperature change is reduced even if the plastic aspherical lens elements are used is reduced.

In this first prior art, the profile of the fluorescent face of projection tube has a curvature so that it is convex on the electron gun side. As a result, the projection lens system is structured so that the normal of the fluorescent face in the marginal area is in the direction of the entrance pupil of the projection lens system and can fetch more light fluxes in comparison with the case using a flat fluorescent face. Therefore, even if the field angle is widened, a relative illuminance of a level which is almost no problem practically can be obtained in the marginal area.

The curvature of field is corrected by the lens element of the sixth lens group (hereinafter referred to as sixth lens). However, if the fluorescent face of projection tube has a curvature so that it is convex on the electron gun side, the generation amount of curvature of field is reduced and the focus performance in the marginal area is improved.

Furthermore, a projection lens system with a wide field angle which realizes a more excellent focus performance without reducing the brightness in the marginal area and an actual art for realizing it are disclosed in U.S. Pat. No. 5,272,540. Hereinafter, the art is referred to as a second prior art.

In the second prior art, a projection lens system having a constitution of five groups by six elements is disclosed and the profile of the fluorescent face of projection tube which is an object is an aspherical profile which is convex on the electron gun side. And has as when the curvature of the profile in the marginal area is smaller than that in the neighborhood of the optical axis. By doing this, highly precise correction of the curvature of field and astigmatism are compatible with each other and the satisfactory focus performance and the light amount which is practically sufficient are reserved in the marginal area of screen.

In this projection lens system, the lens element of the third lens group (hereinafter referred to as third lens) sharing almost all refractive power of the overall lens system has a constitution that a concave lens of large dispersion glass and a convex lens of small dispersion glass are stuck together, and the chromatic aberration is corrected, and the large aperture (the F-number is 0.96) and the high focus performance are compatible with each other. Furthermore, it is structured that combination of the lens element of the first lens group (hereinafter referred to as first lens) and the lens element of the second lens group (hereinafter referred to as second lens) offsets the lowering of the focus performance generated by deformation and expansion of each lens element due to temperature change and humidity change which is an intrinsic problem when plastic lens elements are used.

On the other hand, in a conventional projection lens system, as a lens barrel for assembling each lens element with high precision, a lens barrel having the constitution disclosed in, for example, Japanese Utility Model Application Laid-Open No. 2-51478 is often used. The lens barrel of the prior art has an outer barrel and an inner barrel which is installed inside the outer barrel and can slide in the direction of optical axis of the lens without axial shift. The inner barrel has a constitution that it can be divided into two parts longitudinally in the direction of diameter of the lens along the optical axis of the lens and it has slits for holding a plurality of lens elements at predetermined intervals with high precision on its inner surface.

In the aforementioned projection lens system having a constitution of six lens groups of the first prior art, there are several problems to be solved.

The first problem is a problem caused by the lens constitution. In the aforementioned projection lens system, the third lens having negative refractive power is arranged on the screen side of the lens element of the fourth lens group (hereinafter referred to as fourth lens) sharing almost all the positive refractive power of the overall lens system. The spherical aberration and coma aberration are corrected by the third lens.

Therefore, the location of the entrance pupil of the overall lens system moves to the screen side from the center of the fourth lens. As a result, if an attempt is made to realize a wider field angle (reduction of the projection distance) in the aforementioned lens constitution, correction of the distortion and astigmatism becomes difficult.

Next, the second problem is a point that if an attempt is made to reduce the F-number or (increase the aperture ratio) of the projection lens system having this lens constitution and obtain a sufficient marginal light amount ratio, the apertures of the first, second, and third lenses become larger and the production cost increases.

The share of correction of each lens group in aberration correction of the aforementioned projection lens system is shown below.

The first lens is a spherical lens element of a meniscus profile having positive refractive power and corrects spherical aberration and coma aberration.

The second lens is a plastic aspherical lens element of a meniscus profile having weak positive refractive power and corrects spherical aberration and coma aberration.

The third lens is a spherical lens element having a weak divergent action and corrects spherical aberration and coma aberration.

The fourth lens is a convex—convex glass spherical lens element having a strong convergent action.

Furthermore, the lens element of the fifth lens group (hereinafter referred to as fifth lens) is a plastic aspherical lens element of a meniscus profile having weak positive refractive power and corrects astigmatism, distortion, and coma aberration.

The sixth lens has a constitution that it has a concave surface facing the screen side, has negative refractive power accompanied by a liquid coolant (A), and corrects curvature of field.

Among them, the second lens and fifth lens are a plastic aspherical lens element and have a meniscus profile having weak positive refractive power respectively. This projection lens system of prior art has a constitution that each plastic lens element has little refractive power and the peculiar shift of the focus performance due to a temperature change when the plastic aspherical lens element is used is reduced.

There is a third problem imposed that as mentioned above, in the projection lens system using the first prior art, the applicable lens profile of the plastic aspherical lens is limited to a specific profile and that the aberration correction cannot be attained sufficiently.

A fourth problem is also imposed that since four glass lens elements are included, the cost is increased.

Furthermore, the aspherical surface amount of the fifth lens is little, and the sixth lens is a glass lens element, whereof the lens surface on the screen side is a spherical surface, so that correction of astigmatism and correction of curvature of field are not compatible with each other.

Therefore, a fifth problem arises that correction of astigmatism in the marginal area is difficult.

In the first prior art, it is a subject (of the design) to solve these problems.

A problem of the projection lens system having a constitution of five groups by six elements to be solved in the second prior art is reduction in cost.

The two factors for an increase in the cost of the projection lens system are described below.

The first factor for an increase in cost is the profile of fluorescent face of the projection tube. The main profile of fluorescent face of the projection tube is a spherical fluorescent face at present. When this projection lens system is applied, it is necessary to make the profile of fluorescent face aspherical and the projection tube is to be produced under a special specification, so that it is a factor for an increase in the cost of the set.

The second factor for an increase in cost is that it is essential to use a doublet lens comprising a large dispersion concave lens with a large diameter and a small dispersion convex lens with a large diameter which are stuck together for the third lens so as to realize a large aperture ratio (the F-number is 0.96) in this projection lens system and correct chromatic aberration satisfactorily.

Generally, the price of optical glass increases as the refractive index increases and as the dispersion decreases. In the second prior art, the optical glass used as a third lens of the projection lens system described in Embodiment 1 includes large dispersion glass of SF11 and small dispersion glass of SK16. The prices of these optical glass materials are more than 2 times as expensive as the price of SK5 which is a typical one of optical glass used in the projection lens system such that the price is 2.3 for SF11 and is 2.1 for SK16 (those glass names are abbreviations of Schott, Ltd. and often used in this field).

On the other hand, a problem when the aforementioned conventional lens barrel is used in the projection lens system is that the air temperature in the sealed space inside the lens barrel and the temperature of the lens elements rise, and the heated lens elements expands and deforms, and the focus performance of the projection lens system is lowered extremely.

As a result, it is a subject (of the design) to suppress rising of the air temperature in the sealed space inside the lens barrel and the temperature of the lens elements and to prevent the lens elements from expansion and deformation even if the heat generated from an image generating source is high.

SUMMARY OF THE INVENTION

An object of the present invention is to solve the problems of the projection lens system of the prior art mentioned above and to provide a projection lens system of a wide field angle which uses inexpensive optical glass, has an excellent focus performance even in the marginal area even if the heat generated from an image generating source is high, obtains a bright image, and has a short projection distance and a projection image display apparatus using the system which is excellent in cost performance.

To accomplish the above object, the projection lens system of the present invention uses technical means as described below.

Firstly, to solve the first and second problems of the first prior art, almost all the positive refractive power of the overall lens system is shared by the glass lens elements (hereinafter described as glass power lens). In this case, a lens having negative refractive power is not arranged on the screen side of the lens group including the glass power lens but a plastic aspherical lens element having weak positive refractive power around the optical axis is arranged there. As a result, the entrance pupil does not move to the screen side from the glass power lens, so that the first problem can be solved and a projection lens system with a wide field angle can be realized.

Furthermore, a light flux passing through the lens group including the glass power lens diverges and enters the lens groups positioned on the screen side, so that the aperture of each of lens groups can be made as small as possible and the second problem can be solved.

In the projection lens system of the present invention, to minimize the lowering of the focus performance due to temperature and humidity changes, the refractive power of the plastic aspherical lens element around the optical axis is reduced to 30% of that of the glass power lens or less.

The aberration depending on the aperture is corrected according to the profile of lens surface including aspherical system in the area (the marginal area of the lens element) apart from the optical axis. The system is structured so that the drift of the local refractive power obtained according to the profile of lens surface including aspherical system in the marginal area of the lens due to temperature and humidity changes is offset by combining a plurality of plastic aspherical lens elements. By doing this, the profile of lens element can be decided without affecting aberration correction restrictively and the third problem can be solved.

Many plastic aspherical lens elements having a lens surface including strong aspherical system can be used by the aforementioned technical means, so that the number of glass lens elements can be reduced and the fourth problem can be solved.

To solve the fifth problem, a lens element having negative refractive power with the concave surface facing the screen side is arranged in the location closest to the projection tube which is an image light source, and the lens surface of the lens element on the screen side is formed as an aspherical shape, and hence the astigmatism in the marginal area of the image is reduced. Furthermore, with respect to the lens element arranged on the screen side of this lens element, the profile of lens surface on the projection tube side is formed in a convex shape on the projection tube side around the optical axis and a concave shape on the projection tube side in the marginal area and hence the astigmatism in the marginal area of the image can be reduced with higher precision.

To realize a reduction in cost which is a problem of the projection lens system having the constitution in the second prior art, the two following means are used.

The first means is to form the fluorescent face of a projection tube to be applied to the projection lens system as a spherical fluorescent face. When the fluorescent face of the projection lens system having a constitution of five group by six elements described in the first embodiment of the second prior art is changed to a spherical surface as it is, the length of optical path from an object point in the marginal area on the fluorescent face to the exit surface of the fifth lens is different between a beam of light passing through the saggital plane and a beam of light passing through the meridional plane, so that a great difference is generated in the focus performance between the saggital direction and the meridional direction because astigmatism conspicuously increases in the marginal area. This trend is specially remarkable in the marginal area between 90% of the distance (relative image height from center to corner) from the center of the screen to each corner and each corner.

Therefore, according to the present invention, when the lens surface of the sixth lens having negative refractive power on the screen side is formed in a profile that the lens action (divergent action) in the lens area through which the light flux from an object in the marginal area on the fluorescent face becomes weaker in comparison with that around the optical axis of the lens, the difference between the length of optical path on the saggital plane and that on the meridional plane is reduced. Furthermore, when in the lens element arranged on the screen side of the above-mentioned lens element having negative refractive power, the profile of lens surface on the projection tube side is formed in a convex shape on the projection tube side around the optical axis and in a concave shape on the projection tube side in the marginal area, the difference of length of optical path can be made smaller and the astigmatism in the marginal area can be reduced remarkably.

The second means is to change the third lens to inexpensive optical glass.

For that purpose, correction of chromatic aberration is realized by a large dispersion plastic concave lens element and an inexpensive small dispersion glass convex lens.

It is also effective to install a filter for cutting the spurious component other than the dominant wavelength component among the light emission spectrum of a phosphorescent substance in at least one lens element of the lenses constituting the projection lens system and reduce the generated chromatic aberration itself.

Furthermore, to realize a large aperture, the aforementioned large dispersion plastic concave lens element is formed in a profile of strong aspherical shape and the aberration is corrected with higher precision. Furthermore, the lens profile is formed in a concave meniscus profile in which the concave surface faces the screen side around the optical axis and particularly in a profile that with respect to the lens surface on the projection tube side, the inclination of the lens surface in the marginal area of lens apart from the optical axis is increased. As a result, the entrance height of light flux into the third lens (glass) can be decreased and the diameter of the third lens (glass) can be made smaller when the same F-number is to be obtained, so that the cost can be reduced.

On the other hand, the projection lens system of the present invention is structured so that at least one communicating opening or communicating window extending outside of the projection lens system from the spaces between the lens elements is installed.

Furthermore, at least one space among the spaces between the lens elements is structured so that the communicating opening or communicating window is arranged individually in each of at least two leveling locations practically on the basis of the horizontal plane in the operation status of the projection lens system or continuously over those locations. In this case, the communicating opening or communicating window in the low location functions as an inlet of air and the communicating opening or communicating window in the high location functions as an outlet of air.

To install the communicating opening or communicating window, one of the methods (1) to (4) shown below is used or these methods are used together.

(1) Around the connection point of a lens element holding member for holding at least one lens element and covering the spaces among the lens elements and a connection member for connecting the lens element holding member to the image generating source, a communicating opening or communicating window is arranged as a space surrounded by at least the lens element holding member and the connection member. In this case, it is possible that the volume of this space is restricted by the size of protrusion provided in the lens element holding member or the size of protrusion provided in the connection member.

(2) A communicating opening or communicating window is arranged in the lens element holding member itself.

(3) A lens element holding member comprising a first holding member for holding at least one lens element and a second holding member for fitting and holding the first holding member is structured and a communicating opening or communicating window is arranged between the first holding member and the second holding member. In this case, at lease one groove provided in a concave shape on the inner side of the second holding member may be functioned as a communicating opening or communicating window.

(4) A communicating opening or communicating window is arranged around the periphery of the lens element.

When a communicating opening or communicating window is arranged by one of the aforementioned methods, it is desirable to set the space between the lens element arranged closest to the image generating source among a plurality of lens elements and the lens element second closest to the image generating source as a corresponding space.

The aforementioned communicating opening or communicating window is arranged so as to replace heated air in the spaces among the lens elements with air outside the projection lens system. In this case, new problems may arise that a foreign material such as dust enters from the communicating opening or communicating window and adheres to the lens elements, or an external light enters the projection lens system and the image contrast performance of the projection lens system is lowered, or when the projection lens system is used in a projection type image display apparatus, the image contrast performance of the projection type image display apparatus is remarkably lowered due to light leakage from the inside of the projection lens system.

To eliminate the problems, in the aforementioned projection lens system, in the opening portion of the communicating opening or communicating window toward the outside of the projection lens system, a dust-proof member, for example, a flange-shaped member is arranged in the way to protect the air permeability. Or, the communicating opening or communicating window itself is formed in a bent, or curved, or twisted shape.

In the projection lens system of the present invention, the aforementioned communicating opening or communicating window functions as an air inlet through which air at a low temperature (open air) is introduced and an air outlet through which heated air is ejected in the space among the lens elements in which the communicating opening or communicating window is provided. By doing this, the efficiency of heat radiation from the lens elements is increased by convection of air and the lens elements are suppressed in rising of temperature and hence the expansion and deformation due to rising of temperature are suppressed and as a result, the lens performance, particularly the focus performance are prevented from lowering.

When a projection type cathode ray tube is used as an image generating source, the projection type cathode ray tube becomes a heat generating source. Therefore, when the aforementioned communicating opening or communicating window is provided in the space between the lens element closest to the projection type cathode ray tube and the lens element second closest to it, the effect of the aforementioned action is remarkable. Air has a property that when it is heated, the specific gravity thereof decreases and it flows upward. Therefore, when the height of location of the communicating opening or communicating window which is used as an air outlet is set higher than the height of location of the communicating opening or communicating window which is used as an air inlet on the basis of a certain horizontal plane, a practically sufficient effect can be obtained in the aforementioned action.

On the other hand, when a dust-proof member is arranged in the opening portion of the communicating opening or communicating window toward the outside of the projection lens system when the communicating opening or communicating window itself is formed in a bent, or curved, or twisted shape, entry of a foreign material or light into the projection lens system and light leakage from the inside of the projection lens system can be prevented. As a result, the contrast performance of the projection lens system itself will not be lowered and neither will be readuced the image contrast of the projection type image display apparatus using the projection lens system.

DESCRIPTION OF THE PREFERRED EMBODIMENTS

The embodiments of the present invention will be explained hereunder with reference to the accompanying drawings.

Figure 1:
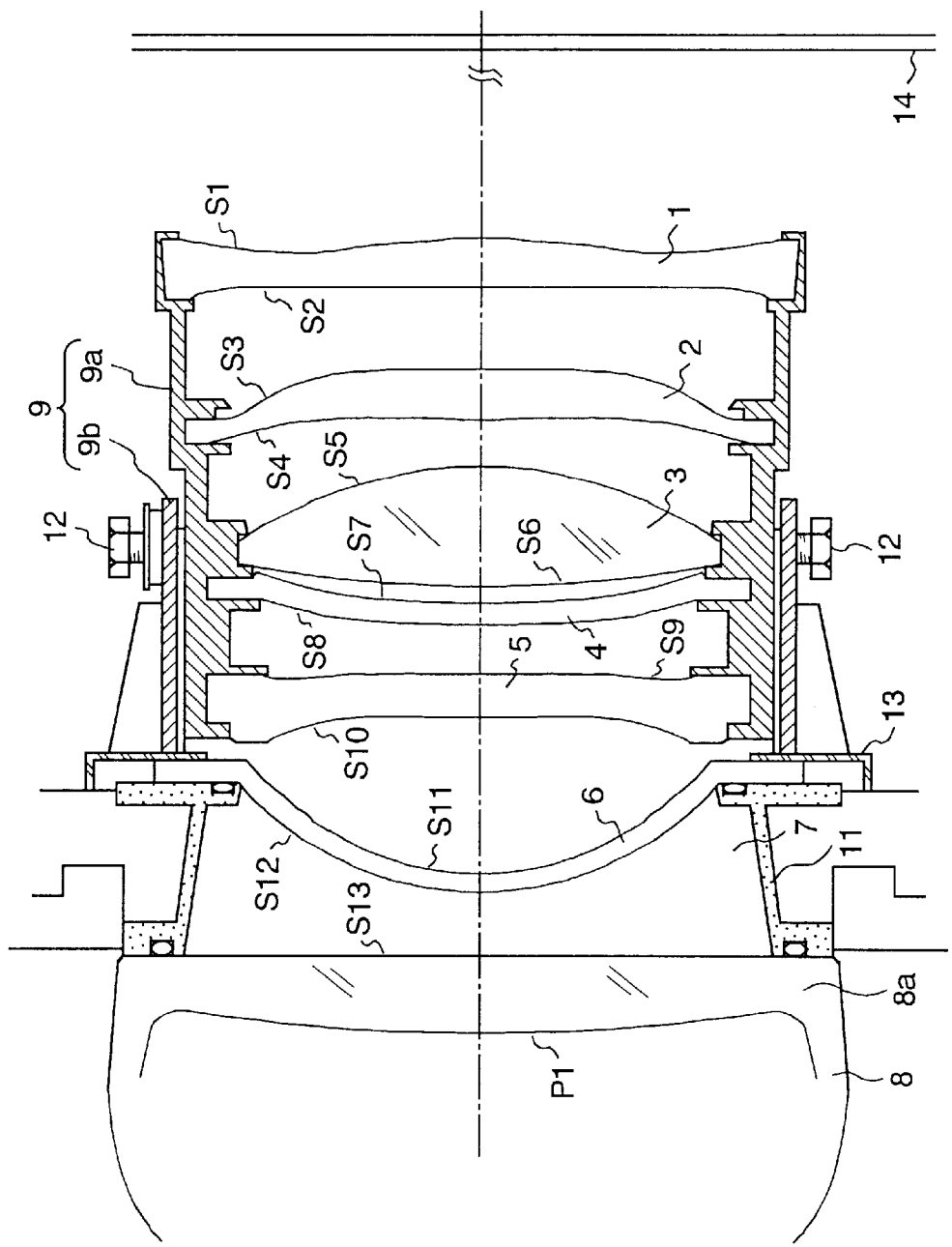
FIG. 1 is a cross sectional view showing the essential section of an embodiment of the projection lens system of the present invention.

FIG. 1 is a cross sectional view showing the essential section of an embodiment of the projection lens system of the present invention.

In FIG. 1, numeral 1 indicates a first lens, 2 a second lens, 3 a third lens, 4 a fourth lens, 5 a fifth lens, 6 a sixth lens, 7 a liquid coolant, 8 a projection type cathode ray tube (hereinafter abbreviated to projection tube) which is an image generating source, 8a a face panel of the projection tube, P1 a fluorescent face of the projection tube, and 9 a lens barrel. The lens barrel 9 is separated into an inner barrel 9a and an outer barrel 9b and the inner barrel 9a includes the first lens to the fifth lens which are incorporated and is fixed to the outer barrel 9b with a set screws 12. Furthermore, the outer barrel 9b is fixed to a coupling bracket 11 via a holding plate 13 with screws (not shown in the drawing). The system is structured so as to enlarge and project an image on the fluorescent face of the projection tube P1 which is an object surface on a screen 14.

Tables 1 to 10 (Embodiments 1, 2, 3, - - - , and 10 are used respectively) show actual lens data which can be fetched by the projection lens system of the present invention.

TABLE 1

$f = 90.49$ mm, $F_{NO} = 0.96$

|  |  | Radius of curvature RD | Axial distance between surfaces | Abbe's number vd/refractive index |
|---|---|---|---|---|
| Screen | Lens surface | ∞ | | |
| | | | 1042.6 | 1.0 |
| 1st lens | $S_1$ | 91.403 | | |
| | | | 8.874 | 57.9/1.49334 |
| | $S_2$ | 280.37 | | |
| | | | 15.473 | 1.0 |
| 2nd lens | $S_3$ | −596.50 | | |
| | | | 9.200 | 57.9/1.49334 |
| | $S_4$ | −590.00 | | |
| | | | 8.7068 | 1.0 |
| 3rd lens | $S_5$ | 81.066 | | |
| | | | 25.000 | 61.25/1.59137 |
| | $S_6$ | −235.00 | | |
| | | | 1.080 | 1.0 |
| 4th lens | $S_7$ | −270.00 | | |
| | | | 4.000 | 30.30/1.58890 |
| | $S_8$ | −450.00 | | |
| | | | 10.80 | 1.0 |
| 5th lens | $S_9$ | 18535.00 | | |
| | | | 8.400 | 57.9/1.49334 |
| | $S_{10}$ | −225.00 | | |
| | | | 30.000 | 1.0 |
| 6th lens | $S_{11}$ | −56.000 | | |
| | | | 3.405 | 57.9/1.49334 |
| | $S_{12}$ | −58.000 | | |
| | | | 11.49 | 1.44704 |
| Transparent medium | | ∞ | | |
| Cathode-ray tube panel | Face | | 14.10 | 1.56232 |
| | Fluorescent face $P_1$ | −350.00 | | |

TABLE 1-continued f = 90.49 mm, F_NO = 0.96

| Lens | Surface | CC | AE | AF | AC | AH |
|---|---|---|---|---|---|---|
| 1st lens | $S_1$ | -14.205306 | $1.27801 \times E - 6$ | $-1.35740 \times E - 9$ | $3.77495 \times E - 13$ | $-3.40452 \times E - 17$ |
|  | $S_2$ | 1.5000000 | $-9.32634 \times E - 8$ | $1.54377 \times E - 10$ | $-7.28237 \times E - 14$ | $2.08978 \times E - 17$ |
| 2nd lens | $S_3$ | 8.0000000 | $2.38533 \times E - 6$ | $1.25739 \times E - 10$ | $-1.02973 \times E - 13$ | $2.20148 \times E - 17$ |
|  | $S_4$ | 8.3999996 | $1.91166 \times E - 6$ | $-5.03454 \times E - 10$ | $1.55701 \times E - 13$ | $-1.27999 \times E - 17$ |
| 4th lens | $S_7$ | 0.0000 | 0.0000 | 0.0000 | 0.0000 | 0.0000 |
|  | $S_8$ | 0.0000 | $-1.74446 \times E - 7$ | $1.55853 \times E - 10$ | $-1.07123 \times E - 13$ | $2.70771 \times E - 17$ |
| 5th lens | $S_9$ | -15.300000 | $-2.64597 \times E - 7$ | $1.96982 \times E - 9$ | $-1.17973 \times E - 12$ | $1.13858 \times E - 16$ |
|  | $S_{10}$ | 0.000 | $9.74735 \times E - 7$ | $1.85426 \times E - 9$ | $-7.84582 \times E - 13$ | $4.27076 \times E - 17$ |
| 6th lens | $S_{11}$ | 0.000 | $-1.34293 \times E - 6$ | $7.37058 \times E - 10$ | $1.53851 \times E - 13$ | $2.42038 \times E - 17$ |

$$Z = \frac{r^2/RD}{1 + \sqrt{1 - (1+CC)r^2/RD^2}} + AE \cdot r^4 + AF \cdot r^6 + AG \cdot r^8 + AH \cdot r^{10}$$

TABLE 2 f = 90.31 mm, F_NO = 1.02

| | Lens surface | Radius of curvature RD | Axial distance between surfaces | Abbe's number vd/refractive index |
|---|---|---|---|---|
| Screen | Lens surface | ∞ | | |
| | | | 1042.6 | 1.0 |
| 1st lens | $S_1$ | 85.301 | | |
| | | | 8.874 | 57.9/1.49334 |
| | $S_2$ | 248.10 | | |
| | | | 20.146 | 1.0 |
| 2nd lens | $S_3$ | -596.50 | | |
| | | | 9.200 | 57.9/1.49334 |
| | $S_4$ | -590.00 | | |
| | | | 4.9334 | 1.0 |
| 3rd lens | $S_5$ | 81.066 | | |
| | | | 22.700 | 61.25/1.59137 |
| | $S_6$ | -235.00 | | |
| | | | 1.080 | 1.0 |
| 4th lens | $S_7$ | -270.00 | | |
| | | | 4.000 | 30.30/1.58890 |
| | $S_8$ | -450.00 | | |
| | | | 10.80 | 1.0 |
| 5th lens | $S_9$ | 18535.00 | | |
| | | | 8.400 | 57.9/1.49334 |
| | $S_{10}$ | -241.19 | | |
| | | | 30.000 | 1.0 |
| 6th lens | $S_{11}$ | -56.000 | | |
| | | | 3.405 | 57.9/1.49334 |
| | $S_{12}$ | -58.000 | | |
| | | | 11.49 | 1.44704 |
| Transparent medium | | ∞ | | |
| | | | 14.10 | 1.56232 |
| Cathode-ray tube panel | Face Fluorescent face $P_1$ | -350.00 | | |

| Lens | Surface | CC | AE | AF | AC | AH |
|---|---|---|---|---|---|---|
| 1st lens | $S_1$ | -14.205306 | $1.92669 \times E - 6$ | $-1.85054 \times E - 9$ | $5.75077 \times E - 13$ | $-6.05405 \times E - 17$ |
|  | $S_2$ | 1.5000000 | $7.18758 \times E - 8$ | $-4.05008 \times E - 10$ | $2.13188 \times E - 13$ | $-1.61270 \times E - 17$ |
| 2nd lens | $S_3$ | 8.0000000 | $2.07465 \times E - 6$ | $4.74347 \times E - 11$ | $6.19323 \times E - 14$ | $-1.81834 \times E - 17$ |
|  | $S_4$ | 8.3999996 | $1.76511 \times E - 6$ | $-2.71126 \times E - 10$ | $1.43099 \times E - 13$ | $-2.74519 \times E - 17$ |
| 4th lens | $S_7$ | 0.0000 | 0.0000 | 0.0000 | 0.0000 | 0.0000 |
|  | $S_8$ | 0.0000 | $-3.76560 \times E - 7$ | $1.20340 \times E - 10$ | $-3.00848 \times E - 14$ | $6.05881 \times E - 18$ |
| 5th lens | $S_9$ | -15.300000 | $-2.64597 \times E - 7$ | $1.96982 \times E - 9$ | $-1.17973 \times E - 12$ | $1.13858 \times E - 16$ |
|  | $S_{10}$ | 0.000 | $1.16291 \times E - 6$ | $1.80247 \times E - 9$ | $-7.02182 \times 8 - 13$ | $1.93070 \times E - 17$ |
| 6th lens | $S_{11}$ | 0.000 | $-1.59847 \times E - 6$ | $1.35363 \times E - 9$ | $-6.40009 \times E - 13$ | $1.66139 \times E - 16$ |

$$Z = \frac{r^2/RD}{1 + \sqrt{1 - (1+CC)r^2/RD^2}} + AE \cdot r^4 + AF \cdot r^6 + AG \cdot r^8 + AH \cdot r^{10}$$

TABLE 3 f = 90.77 mm, F$_{NO}$ = 1.01

|  |  | Radius of curvature RD | Axial distance between surfaces | Abbe's number vd/refractive index |
|---|---|---|---|---|
| Screen | Lens surface | ∞ |  |  |
|  |  |  | 1042.6 | 1.0 |
| 1st lens | S$_1$ | 106.180 |  |  |
|  |  |  | 8.874 | 57.9/1.49334 |
|  | S$_2$ | 267.06 |  |  |
|  |  |  | 18.075 | 1.0 |
| 2nd lens | S$_3$ | −1483.80 |  |  |
|  |  |  | 9.200 | 57.9/1.49334 |
|  | S$_4$ | −339.15 |  |  |
|  |  |  | 9.1674 | 1.0 |
| 3rd lens | S$_5$ | 76.594 |  |  |
|  |  |  | 22.700 | 61.25/1.59137 |
|  | S$_6$ | −235.00 |  |  |
|  |  |  | 1.080 | 1.0 |
| 4th lens | S$_7$ | −270.00 |  |  |
|  |  |  | 4.000 | 30.30/1.58890 |
|  | S$_8$ | −450.00 |  |  |
|  |  |  | 10.80 | 1.0 |
| 5th lens | S$_9$ | 18535.00 |  |  |
|  |  |  | 8.400 | 57.9/1.49334 |
|  | S$_{10}$ | −577.72 |  |  |
|  |  |  | 30.000 | 1.0 |
| 6th lens | S$_{11}$ | −55.500 |  |  |
|  |  |  | 3.405 | 57.9/1.49334 |
|  | S$_{12}$ | −58.000 |  |  |
|  |  |  | 11.49 | 1.44704 |
| Transparent medium |  | ∞ |  |  |
|  |  |  | 14.10 | 1.56232 |
| Cathode-ray tube panel | Face Fluorescent face P$_1$ | −350.00 |  |  |

| Lens | Surface | CC | AE | AF | AC | AH |
|---|---|---|---|---|---|---|
| 1st lens | S$_1$ | −14.205306 | −4.17615 × E − 7 | −7.58755 × E − 10 | 3.11083 × E − 13 | −3.26331 × E − 17 |
|  |  | 1.5000000 | −1.25741 × E − 6 | 5.87530 × E − 10 | −1.83314 × E − 13 | 3.84552 × E − 17 |
| 2nd lens | S$_3$ | 8.0000000 | 2.05903 × E − 6 | 7.77375 × E − 10 | −3.99801 × E − 13 | 7.17568 × E − 17 |
|  | S$_4$ | 8.3999996 | 1.58107 × E − 6 | 3.39912 × E − 10 | −1.74104 × E − 13 | 3.07068 × E − 17 |
| 4th lens | S$_7$ | 0.0000 | 0.0000 | 0.0000 | 0.0000 | 0.0000 |
|  |  | 0.0000 | −5.47788 × E − 7 | 3.08341 × E − 10 | −6.34311 × E − 14 | 9.31559 × E − 18 |
| 5th lens | S$_9$ | −15.300000 | −3.22064 × E − 7 | 2.42981 × E − 9 | −1.69278 × E − 12 | 2.46305 × E − 16 |
|  |  | 0.000 | 1.58758 × E − 6 | 2.05251 × E − 9 | −9.15005 × E − 13 | 5.00000 × E − 17 |
| 6th lens | S$_{11}$ | 0.000 | −1.62384 × E − 6 | 1.46180 × E − 9 | −6.25537 × E − 13 | 1.79061 × E − 16 |

$$Z = \frac{r^2/RD}{1 + \sqrt{1 - (1 + CC)r^2/RD^2}} + AE \cdot r^4 + AF \cdot r^6 + AG \cdot r^8 + AH \cdot r^{10}$$

TABLE 4 f = 89.47 mm, F$_{NO}$ = 1.00

|  |  | Radius of curvature RD | Axial distance between surfaces | Abbe's number vd/refractive index |
|---|---|---|---|---|
| Screen | Lens surface | ∞ |  |  |
|  |  |  | 1042.6 | 1.0 |
| 1st lens | S$_1$ | 87.060 |  |  |
|  |  |  | 8.874 | 57.9/1.49334 |
|  | S$_2$ | 166.59 |  |  |
|  |  |  | 13.907 | 1.0 |
| 2nd lens | S$_3$ | −737.56 |  |  |
|  |  |  | 9.200 | 57.9/1.49334 |
|  | S$_4$ | −188.83 |  |  |
|  |  |  | 10.482 | 1.0 |
| 3rd lens | S$_5$ | 90.712 |  |  |
|  |  |  | 22.700 | 61.25/1.59137 |
|  | S$_6$ | −235.00 |  |  |
|  |  |  | 1.080 | 1.0 |

TABLE 4-continued f = 89.47 mm, F_NO = 1.00

| | | | | |
|---|---|---|---|---|
| 4th lens | $S_7$ | −270.00 | | |
| | | | 4.000 | 30.30/1.58890 |
| | $S_8$ | −450.00 | | |
| | | | 10.80 | 1.0 |
| 5th lens | $S_9$ | 18535.00 | | |
| | | | 8.400 | 57.9/1.49334 |
| | $S_{10}$ | −241.19 | | |
| | | | 30.000 | 1.0 |
| 6th lens | $S_{11}$ | −52.268 | | |
| | | | 3.405 | 57.9/1.49334 |
| | $S_{12}$ | −58.000 | | |
| | | | 11.49 | 1.44704 |
| Transparent | | ∞ | | |
| Cathode-ray | Face | | 14.10 | 1.56232 |
| tube panel | Fluorescent | −350.00 | | |
| | face $P_1$ | | | |

| Lens | Surface | CC | AE | AF | AC | AH |
|---|---|---|---|---|---|---|
| 1st lens | $S_1$ | −14.205306 | 1.81161 × E − 6 | −1.81880#E − 9 | 4.93904 × E − 13 | −4.44977 × E − 17 |
| | $S_2$ | 1.5000000 | 4.78526 × E − 7 | −5.76838 × E − 10 | 3.61505 × E − 13 | −5.85045 × E − 17 |
| 2nd lens | $S_3$ | 8.0000000 | 1.05968 × E − 6 | 2.18392 × E − 10 | 3.29367 × E − 15 | −9.38718 × E − 18 |
| | $S_4$ | 8.3999996 | 6.04039 × E − 7 | −1.05414 × E − 10 | 2.82509 × E − 14 | 1.17689 × E − 17 |
| 4th lens | $S_7$ | 0.0000 | 0.0000 | 0.0000 | 0.0000 | 0.0000 |
| | $S_8$ | 0.0000 | −5.23821 × E − 7 | 3.86150 × E − 11 | 3.41462 × E − 16 | 1.15405 × E − 18 |
| 5th lens | $S_9$ | −15.300000 | −2.81921 × E − 7 | 1.77440 × E − 9 | −1.02161 × E − 12 | 1.07906 × E − 16 |
| | $S_{10}$ | 0.000 | 1.16291 × E − 6 | 1.80247 × E − 9 | −7.02182 × E − 13 | 1.93070 × E − 17 |
| 6th lens | $S_{11}$ | 0.000 | −8.30584 × E − 7 | −3.19962 × E − 10 | 7.06789 × E − 13 | −2.63143 × E − 16 |

$$Z = \frac{r^2/RD}{1 + \sqrt{1 - (1 + CC)r^2/RD^2}} + AE \cdot r^4 + AF \cdot r^6 + AG \cdot r^8 + AH \cdot r^{10}$$

TABLE 5 f = 90.13 mm, F_NO = 1.00

| | | Radius of curvature RD | Axial distance between surfaces | Abbe's number vd/refractive index |
|---|---|---|---|---|
| Screen | Lens surface | ∞ | | |
| | | | 1042.6 | 1.0 |
| 1st lens | $S_1$ | 112.98 | | |
| | | | 8.874 | 57.9/1.49334 |
| | $S_2$ | 415.40 | | |
| | | | 17.286 | 1.0 |
| 2nd lens | $S_3$ | −562.36 | | |
| | | | 9.200 | 57.9/1.49334 |
| | $S_4$ | −339.15 | | |
| | | | 8.1494 | 1.0 |
| 3rd lens | $S_5$ | 76.594 | | |
| | | | 22.700 | 61.25/1.59137 |
| | $S_6$ | −235.00 | | |
| | | | 3.080 | 1.0 |
| 4th lens | $S_7$ | −270.00 | | |
| | | | 4.000 | 30.30/1.58840 |
| | $S_8$ | −450.00 | | |
| | | | 9.300 | 1.0 |
| 5th lens | $S_9$ | 18535.00 | | |
| | | | 8.400 | 57.9/1.49334 |
| | $S_{10}$ | −400.00 | | |
| | | | 29.500 | 1.0 |
| 6th lens | $S_{11}$ | −55.499 | | |
| | | | 3.405 | 57.9/1.49334 |
| | $S_{12}$ | −58.000 | | |
| | | | 11.49 | 1.44704 |
| Transparent medium | | ∞ | | |
| Cathode-ray | Face | | 14.1 | 1.56232 |
| tube panel | Fluorescent | −350.00 | | |
| | face $P_1$ | | | |

TABLE 5-continued f = 90.13 mm, $F_{NO}$ = 1.00

| Lens | Surface | CC | AE | AF | AC | AH |
|---|---|---|---|---|---|---|
| 1st lens | $S_1$ | −14.205306 | −4.99132 × E − 7 | −7.52281 × E − 10 | 3.04572 × E − 13 | −3.17985 × E − 17 |
|  | $S_2$ | 1.500009 | −9.63142 × E − 7 | −4.48452 × E − 10 | −1.48606 × E − 13 | 3.24547 × E − 17 |
| 2nd lens | $S_3$ | 8.000000 | 2.70666 × E − 6 | 3.50490 × E − 10 | −2.62215 × E − 13 | 4.22459 × E − 17 |
|  | $S_4$ | 8.340000 | 2.08869 × E − 6 | −1.90134 × E − 10 | 2.77475 × E − 14 | −1.42593 × E − 17 |
| 4th lens | $S_5$ | 0.000000 | −7.29331 × E − 7 | −1.99626 × E − 10 | 6.48129 × E − 15 | −1.12055 × E − 18 |
|  | $S_8$ | 0.000000 | −1.29715 × E − 6 | 1.84357 × E − 10 | −1.46193 × E − 13 | 2.60704 × E − 17 |
| 5th lens | $S_9$ | −15.300000 | −1.70710 × E − 7 | 2.13023 × E − 9 | −1.37605 × E − 12 | 1.09708 × E − 16 |
|  | $S_{10}$ | 0.00000 | 1.58758 × E − 6 | 2.05252 × E − 9 | −9.15005 × E − 13 | 5.00000 × E − 17 |
| 6th lens | $S_{11}$ | 0.000000 | −1.89756 × E − 6 | 1.72825 × E − 9 | −1.08034 × E − 12 | 3.39635 × E − 16 |

$$Z = \frac{r^2/RD}{1 + \sqrt{1-(1+CC)r^2/RD^2}} + AE \cdot r^4 + AF \cdot r^6 + AG \cdot r^8 + AH \cdot r^{10}$$

TABLE 6 f = 90.28 mm, $F_{NO}$ = 1.00

| Lens | Surface | Radius of curvature RD | Axial distance between surfaces | Abbe's number vd/refractive index |
|---|---|---|---|---|
| Screen | Lens surface | ∞ |  |  |
|  |  |  | 1050.0 | 1.0 |
| 1st lens | $S_1$ | 115.670 |  |  |
|  |  |  | 8.874 | 57.9/1.49334 |
|  | $S_2$ | 335.03 |  |  |
|  |  |  | 17.162 | 1.0 |
| 2nd lens | $S_3$ | −1054.40 |  |  |
|  |  |  | 9.200 | 57.9/1.49334 |
|  | $S_4$ | −261.89 |  |  |
|  |  |  | 5.8105 | 1.0 |
| 3rd lens | $S_5$ | 71.717 |  |  |
|  |  |  | 22.700 | 61.25/1.59137 |
|  | $S_6$ | −325.88 |  |  |
|  |  |  | 2.267 | 1.0 |
| 4th lens | $S_7$ | −290.07 |  |  |
|  |  |  | 4.000 | 30.30/1.58890 |
|  | $S_8$ | 5000.00 |  |  |
| 5th lens | $S_9$ | 928.70 | 9.300 | 1.0 |
|  |  |  | 8.400 | 57.9/1.49334 |
|  | $S_{10}$ | −336.67 |  |  |
|  |  |  | 30.189 | 1.0 |
| 6th lens | $S_{11}$ | −54.636 |  |  |
|  |  |  | 3.405 | 57.9/1.49334 |
|  | $S_{12}$ | −58.000 |  |  |
|  |  |  | 11.49 | 1.44704 |
| Transparent medium |  | ∞ |  |  |
|  |  |  | 14.10 | 1.56232 |
| Cathode-ray tube panel | Face Fluorescent face $P_1$ | −350.00 |  |  |

| Lens | Surface | CC | AE | AF | AC | AH |
|---|---|---|---|---|---|---|
| 1st lens | $S_1$ | −14.898250 | −7.47696 × E − 7 | −7.73792 × E − 10 | 3.44880 × E − 13 | −3.75545 × E − 17 |
|  | $S_2$ | 5.5688664 | −1.09894 × E − 6 | 5.28791 × E − 10 | −2.05281 × E − 13 | 4.66837 × E − 17 |
| 2nd lens | $S_3$ | −2316.3117 | 2.54450 × E − 6 | 5.62992 × E − 10 | −3.61632 × E − 13 | 5.44320 × E − 17 |
|  | $S_4$ | 11.690594 | 1.79735 × E − 6 | 4.46261 × E − 11 | −1.10792 × E − 13 | 6.60349 × E − 18 |
| 4th lens | $S_7$ | 22.120667 | −5.45630 × E − 7 | −1.25450 × E − 10 | 1.70354 × E − 14 | −1.41437 × E − 17 |
|  | $S_8$ | −719.55890 | −1.28076 × E − 6 | 1.68255 × E − 10 | −1.91393 × E − 13 | 3.00716 × E − 17 |
| 5th lens | $S_9$ | −15.300000 | −4.49218 × E − 7 | 1.60071 × E − 9 | −1.19463 × E − 12 | −5.83877 × E − 17 |
|  | $S_{10}$ | 0.00000 | 1.58758 × E − 6 | 2.05251 × E − 9 | −9.15005 × E − 13 | 5.00000 × E − 17 |
| 6th lens | $S_{11}$ | −0.5923559 | −1.91950 × E − 6 | 1.26443 × E − 9 | −7.45525 × E − 13 | 2.90386 × E − 16 |

$$Z = \frac{r^2/RD}{1 + \sqrt{1-(1+CC)r^2/RD^2}} + AE \cdot r^4 + AF \cdot r^6 + AG \cdot r^8 + AH \cdot r^{10}$$

TABLE 7 f = 90.34 mm, F$_{NO}$ = 1.00

| | | Radius of curvature RD | Axial distance between surfaces | Abbe's number vd/refractive index |
|---|---|---|---|---|
| Screen | Lens surface | ∞ | | |
| | | | 1050.0 | 1.0 |
| 1st lens | S$_1$ | 114.560 | | |
| | | | 8.874 | 57.9/1.49334 |
| | S$_2$ | 299.87 | | |
| | | | 17.162 | 1.0 |
| 2nd lens | S$_3$ | −866.97 | | |
| | | | 9.200 | 57.9/1.49334 |
| | S$_4$ | −239.70 | | |
| | | | 5.0793 | 1.0 |
| 3rd lens | S$_5$ | 71.114 | | |
| | | | 22.700 | 61.25/1.59137 |
| | S$_6$ | −378.83 | | |
| | | | 2.737 | 1.0 |
| 4th lens | S$_7$ | −287.97 | | |
| | | | 4.000 | 30.30/1.58890 |
| | S$_8$ | 4000.00 | | |
| | | | 9.300 | 1.0 |
| 5th lens | S$_9$ | 613.06 | | |
| | | | 8.400 | 57.9/1.49334 |
| | S$_{10}$ | −344.07 | | |
| | | | 30.312 | 1.0 |
| 6th lens | S$_{11}$ | −54.393 | | |
| | | | 3.405 | 57.9/1.49334 |
| | S$_{12}$ | −58.000 | | |
| | | | 11.490 | 1.44704 |
| Transparent medium | | ∞ | | |
| Cathode-ray tube panel | Face Fluorescent face P$_1$ | −350.00 | 14.10 | 1.56232 |

| Lens | Surface | CC | AE | AF | AC | AH |
|---|---|---|---|---|---|---|
| 1st lens | S$_{1i}$ | −13.429961 | −8.40169 × E − 7 | −7.76450 × E − 10 | 3.51328 × E − 13 | −3.82801 × E − 17 |
| | S$_2$ | −3.3351539 | −1.11543 × E − 6 | 5.31625 × E − 10 | −2.10620 × E − 13 | 4.81196 × E − 17 |
| 2nd lens | S$_3$ | −959.82674 | 2.58831 × E − 6 | 5.51215 × E − 10 | −3.56294 × E − 13 | 5.36534 × E − 17 |
| | S$_4$ | 10.354769 | 1.80263 × E − 6 | 7.19625 × E − 11 | −1.18864 × E − 13 | 7.75962 × E − 18 |
| 4th lens | S$_7$ | 22.120667 | −5.45630 × E − 7 | −1.25450 × E − 10 | 1.70354 × E − 14 | −1.41437 × E − 17 |
| | S$_9$ | −3630.1763 | −1.25638 × E − 6 | 1.51585 × E − 10 | −1.90122 × E − 13 | 3.04799 × E − 17 |
| 5th lens | S$_9$ | −15.300000 | −4.18973 × E − 7 | 1.51153 × E − 9 | −1.11826 × E − 12 | 1.08743 × E − 16 |
| | S$_{10}$ | 0.000 | 1.58758 × E − 6 | 2.05251 × E − 9 | −9.15005 × E − 13 | 4.99999 × E − 17 |
| 6th lens | S$_{11}$ | −0.0354248 | −1.33128 × E − 6 | 1.27556 × E − 9 | −6.55222 × E − 13 | 3.04020 × E − 16 |

$$Z = \frac{r^2/RD}{1 + \sqrt{1 - (1 + CC)r^2/RD^2}} + AE \cdot r^4 + AF \cdot r^6 + AG \cdot r^8 + AH \cdot r^{10}$$

TABLE 8 f = 90.10 mm, F$_{NO}$ = 1.00

| | | Radius of curvature RD | Axial distance between surfaces | Abbe's number vd/refractive index |
|---|---|---|---|---|
| Screen | Lens surface | ∞ | | |
| | | | 1042.6 | 1.0 |
| 1st lens | S$_1$ | 110.91 | | |
| | | | 8.874 | 57.9/1.49334 |
| | S$_2$ | 393.88 | | |
| | | | 17.431 | 1.0 |
| 2nd lens | S$_3$ | −562.36 | | |
| | | | 9.200 | 57.9/1.49334 |
| | S$_4$ | −339.15 | | |
| | | | 7.8423 | 1.0 |
| 3rd lens | S$_5$ | 76.594 | | |
| | | | 22.700 | 61.25/1.59137 |
| | S$_6$ | −235.00 | | |
| | | | 2.080 | 1.0 |

TABLE 8-continued f = 90.10 mm, F$_{NO}$ = 1.00

| | | | | |
|---|---|---|---|---|
| 4th lens | S$_7$ | −270.00 | | |
| | | | 4.000 | 30.30/1.58840 |
| | S$_8$ | −450.00 | | |
| | | | 10.300 | 1.0 |
| 5th lens | S$_9$ | 18535.00 | | |
| | | | 8.400 | 57.9/1.49334 |
| | S$_{10}$ | −400.00 | | |
| | | | 29.500 | 1.0 |
| 6th lens | S$_{11}$ | −55.499 | | |
| | | | 3.405 | 57.9/1.49334 |
| | S$_{12}$ | −58.000 | | |
| | | | 11.49 | 1.44704 |
| Transparent medium | | ∞ | | |
| Cathode-ray tube panel | Face Fluorescent face P$_1$ | −350.00 | 14.1 | 1.56232 |

| Lens | Surface | CC | AE | AF | AG | AH |
|---|---|---|---|---|---|---|
| 1st lens | S$_1$ | −14.205306 | −3.49264 × E − 7 | −7.51764 × E − 10 | 2.98572 × E − 13 | −3.16781 × E − 17 |
| | S$_2$ | 1.500000 | −8.62273 × E − 7 | 4.44555 × E − 10 | −1.36020 × E − 13 | 2.95057 × E − 17 |
| 2nd lens | S$_3$ | 8.000000 | 2.63183 × E − 6 | 3.36531 × E − 10 | −2.58187 × E − 13 | 4.36505 × E − 17 |
| | S$_4$ | 8.340000 | 2.02573 × E − 6 | −2.24606 × E − 10 | 2.83556 × E − 14 | −1.05000 × E − 17 |
| 4th lens | S$_7$ | 0.000000 | −5.45630 × E − 7 | −1.25450 × E − 10 | 1.70354 × E − 14 | −1.41437 × E − 17 |
| | S$_8$ | 0.000000 | −1.02404 × E − 6 | 2.45508 × E − 10 | −1.44920 × E − 13 | 1.38124 × E − 17 |
| 5th lens | S$_9$ | −15.300000 | −7.06392 × E − 7 | 2.06151 × E − 9 | −1.30794 × E − 12 | 7.28924 × E − 17 |
| | S$_{10}$ | 0.00000 | 1.58758 × E − 6 | 2.05252 × E − 9 | −9.15005 × E − 13 | 5.00000 × E − 17 |
| 6th lens | S$_{11}$ | 0.000000 | −1.82729 × E − 6 | 1.68806 × E − 9 | −1.07491 × E − 12 | 3.50966 × E − 16 |

$$Z = \frac{r^2/RD}{1 + \sqrt{1 - (1 + CC)r^2/RD^2}} + AE \cdot r^4 + AF \cdot r^6 + AG \cdot r^8 + AH \cdot r^{10}$$

TABLE 9 f = 90.33 mm, F$_{NO}$ = 1.00

| | | Radius of curvature RD | Axial distance between surfaces | Abbe's number vd/refractive index |
|---|---|---|---|---|
| Screen | Lens surface | ∞ | | |
| | | | 1050.0 | 1.0 |
| 1st lens | S$_1$ | 109.780 | | |
| | | | 8.874 | 57.9/1.49334 |
| | S$_2$ | 386.22 | | |
| | | | 16.778 | 1.0 |
| 2nd lens | S$_3$ | −562.36 | | |
| | | | 9.200 | 57.9/1.49334 |
| | S$_4$ | −339.15 | | |
| | | | 10.013 | 1.0 |
| 3rd lens | S$_5$ | 76.594 | | |
| | | | 22.300 | 61.25/1.59137 |
| | S$_6$ | −235.00 | | |
| | | | 2.080 | 1.0 |
| 4th lens | S$_7$ | −270.00 | | |
| | | | 4.000 | 30.30/1.58890 |
| | S$_8$ | −450.00 | | |
| | | | 10.300 | 1.0 |
| 5th lens | S$_9$ | 18535.00 | | |
| | | | 8.400 | 57.9/1.49334 |
| | S$_{10}$ | −400.00 | | |
| | | | 29.500 | 1.0 |
| 6th lens | S$_{11}$ | −55.499 | | |
| | | | 3.405 | 57.9/1.49334 |
| | S$_{12}$ | −58.000 | | |
| | | | 11.49 | 1.44704 |
| Transparent medium | | ∞ | | |
| Cathode-ray tube panel | Face Fluorescent face P$_1$ | −350.00 | 14.10 | 1.56232 |

TABLE 9-continued f = 90.33 mm, F$_{NO}$ = 1.00

| Lens | Surface | CC | AE | AF | AC | AH |
|---|---|---|---|---|---|---|
| 1st lens | S$_1$ | −14.205306 | −3.77711 × E − 7 | −6.80543 × E − 10 | 2.76889 × E − 13 | −2.92638 × E − 17 |
|  | S$_2$ | 1.5000000 | −9.39630 × E − 7 | 5.48052 × E − 10 | −1.69877 × E − 13 | 3.37537 × E − 17 |
| 2nd lens | S$_3$ | 8.0000000 | 2.50070 × E − 6 | 4.30750 × E − 10 | −2.98735 × E − 13 | 5.40955 × E − 17 |
|  | S$_4$ | 8.4000000 | 1.94248 × E − 6 | −1.45666 × E − 10 | −7.76624 × E − 15 | 3.96630 × E − 18 |
| 4th lens | S$_5$ | 0.000000 | −1.11617 × E − 7 | −2.69651 × E − 11 | −1.97791 × E − 15 | −1.56427 × E − 17 |
|  | 5$_8$ | 0.000000 | −5.02307 × E − 7 | 3.06274 × E − 10 | −1.28546 × E − 13 | −1.80677 × E − 19 |
| 5th lens | S$_9$ | −15.300000 | 2.76567 × E − 8 | 2.13667 × E − 9 | −1.35824 × E − 12 | 1.19636 × E − 16 |
|  | S$_{10}$ | 0.00000 | 1.58758 × E − 6 | 2.05251 × E − 9 | −9.15005 × E − 13 | 5.00000 × E − 17 |
| 6th lens | S$_{11}$ | 0.00000 | −1.62935 × E − 6 | 1.40012 × E − 9 | −7.34993 × E − 13 | 2.07431 × E − 16 |

$$Z = \frac{r^2/RD}{1 + \sqrt{1 - (1 + CC)r^2/RD^2}} + AE \cdot r^4 + AF \cdot r^6 + AG \cdot r^8 + AH \cdot r^{10}$$

TABLE 10 f = 90.28 mm, F$_{NO}$ = 1.00

|  |  | Radius of curvature RD | Axial distance between surfaces | Abbe's number vd/refractive index |
|---|---|---|---|---|
| Screen | Lens surface | ∞ |  |  |
|  |  |  | 1042.6 | 1.0 |
| 1st lens | S$_1$ | 110.220 |  |  |
|  |  |  | 8.874 | 57.9/1.49334 |
|  | S$_2$ | 376.07 |  |  |
|  |  |  | 16.478 | 1.0 |
| 2nd lens | S$_3$ | −562.36 |  |  |
|  |  |  | 9.200 | 57.9/1.49334 |
|  | S$_4$ | −339.15 |  |  |
|  |  |  | 8.9875 | 1.0 |
| 3rd lens | S$_5$ | 76.594 |  |  |
|  |  |  | 22.700 | 61.25/1.59137 |
|  | S$_6$ | −235.00 |  |  |
|  |  |  | 3.080 | 1.0 |
| 4th lens | S$_7$ | −270.00 |  |  |
|  |  |  | 4.000 | 30.30/1.58890 |
|  | S$_8$ | −450.00 |  |  |
|  |  |  | 9.300 | 1.0 |
| 5th lens | S$_9$ | 18535.00 |  |  |
|  |  |  | 8.400 | 57.9/1.49334 |
|  | S$_{10}$ | −400.00 |  |  |
|  |  |  | 29.500 | 1.0 |
| 6th lens | S$_{11}$ | −55.499 |  |  |
|  |  |  | 3.405 | 57.9/1.49334 |
|  | S$_{12}$ | −58.000 |  |  |
|  |  |  | 11.490 | 1.44704 |
| Transparent medium |  | ∞ |  |  |
|  |  |  | 14.10 | 1.56232 |
| cathode-ray tube panel face P$_1$ | Face Fluorescent | −350.00 |  |  |

| Lens | Surface | CC | AE | AF | AC | AH |
|---|---|---|---|---|---|---|
| 1st lens | S$_1$ | −14.205306 | −6.05201 × E − 7 | −7.33372 × E − 10 | 3.22224 × E − 13 | −3.52762 × E − 17 |
|  | S$_2$ | 1.5000000 | −1.21465 × E − 6 | 6.09643 × E − 10 | −1.89740 × E − 13 | 3.97475 × E − 17 |
| 2nd lens | S$_3$ | 8.0000000 | 2.38762 × E − 6 | 6.05052 × E − 10 | −3.78418 × E − 13 | 5.98085 × E − 17 |
|  | S$_4$ | 8.4000000 | 1.78170 × E − 6 | 6.59630 × E − 11 | −1.20208 × E − 13 | 1.50850 × E − 17 |
| 4th lens | S$_7$ | 0.000000 | −5.45630 × E − 7 | −1.25450 × E − 10 | 1.70354 × E − 14 | −1.41437 × E − 17 |
|  | S$_8$ | 0.000000 | −1.10393 × E − 6 | 3.73070 × E − 10 | −2.13647 × E − 13 | 2.70690 × E − 17 |
| 5th lens | S$_9$ | −15.300000 | −3.51269 × E − 8 | 2.02646 × E − 9 | −1.25938 × E − 12 | 8.23050 × E − 17 |
|  | S$_{10}$ | 0.00000 | 1.58758 × E − 6 | 2.05251 × E − 9 | −9.15005 × E − 13 | 4.99999 × E − 17 |
| 6th lens | S$_{11}$ | 0.00000 | −1.90908 × E − 6 | 1.65847 × E − 9 | −9.59000 × E − 13 | 2.77588 × E − 16 |

$$Z = \frac{r^2/RD}{1 + \sqrt{1 - (1 + CC)r^2/RD^2}} + AE \cdot r^4 + AF \cdot r^6 + AG \cdot r^8 + AH \cdot r^{10}$$

According to the embodiments of the present invention, the focal length of the single sixth lens and the focal length of the overall projection lens system synthesizing every lens are calculated including the face panel 8a of the projection tube, the liquid coolant 7, and the fluorescent face P1.

Figure 2:
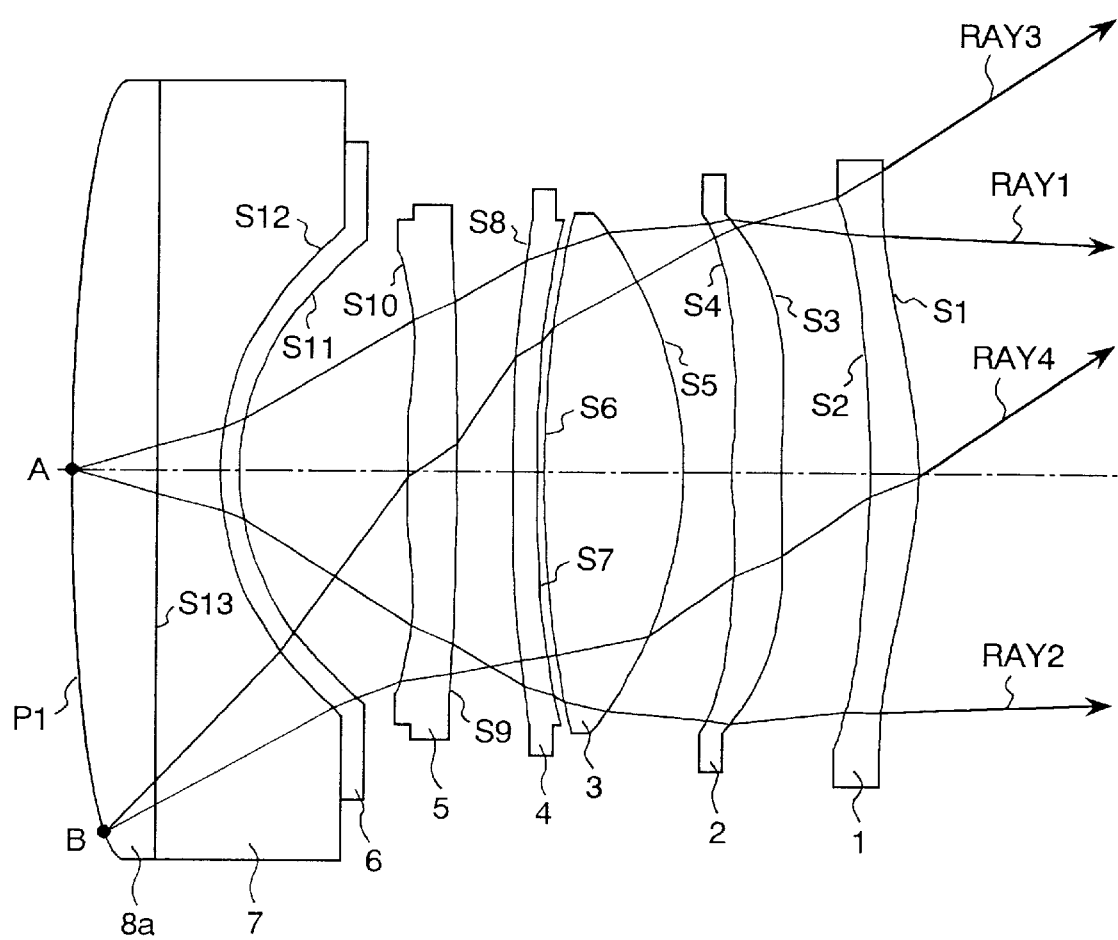
FIG. 2 is a cross sectional view showing the arrangement of lens elements and outline of the ray tracing result in Embodiment 1 of the projection lens system of the present invention.
Figure 3:
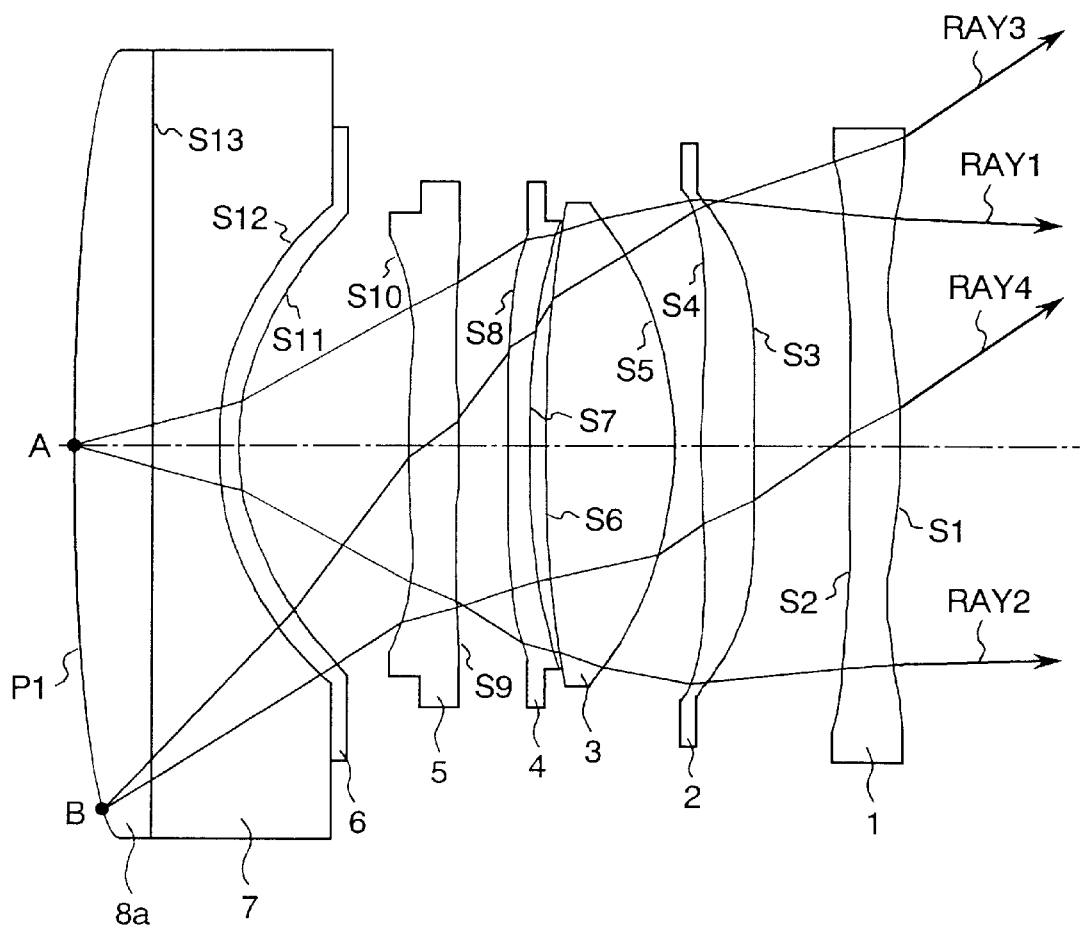
FIG. 3 is a cross sectional view showing the arrangement of lens elements and outline of the ray tracing result in Embodiment 7 of the projection lens system of the present invention.
Figure 4:
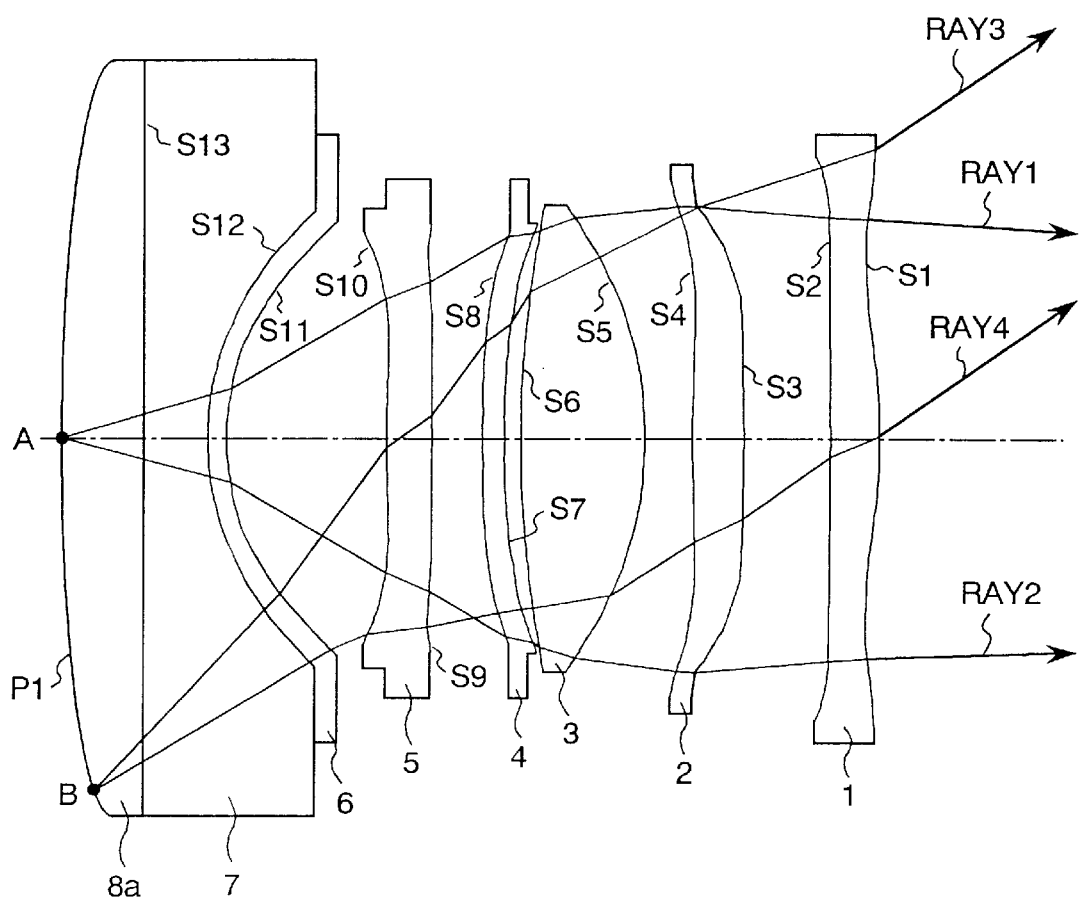
FIG. 4 is a cross sectional view showing the arrangement of lens elements and outline of the ray tracing result in Embodiment 10 of the projection lens system of the present invention.

FIGS. 2, 3, and 4 are cross sectional views showing the arrangement of lens elements and outline of the ray tracing result in the projection lens system shown in Embodiments 1, 7, and 10 and the lens barrel and other components are omitted from reason of explanation. The lens profile and arrangement shown in FIG. 4 are the same as those shown in FIG. 1.

The projection lens system used in the embodiments of the present invention is structured so that when rasters with a diagonal of 5.33 inch are displayed on the fluorescent face of the projection tube P1 and enlarged and projected as image with a diagonal of 60 inch onto the screen, a best performance can be obtained. The semi-field angle of the projection lens system is 36° and a wide field angle is realized. Therefore, as described later, in a rear projection type image display apparatus such as a projection television set having a constitution of one reflecting mirror for folding the light path, a sufficiently compact set can be realized.

Next, how to read the lens data will be explained on the basis of Table 1. Table 1 divides and displays data into spherical surface data mainly handling the lens area in the neighborhood of the optical axis and aspherical surface data in the marginal area thereof.

The table shows that the radius of curvature of the screen is infinity (that is, a plane), and the distance (axial distance between surfaces) on the optical axis from the screen to the surface S1 of the first lens 1 is 1042.6 mm, and the refractive index of the medium between them is 1.0. The table also shows that the radius of curvature of the lens surface S1 is 91.403 mm (the center of curvature is on the image generating source side), and the distance (axial distance between surfaces) on the optical axis between the lens surfaces S1 and S2 is 8.874 mm, and the refractive index of the medium between them is 1.49334. In the same way, the table shows lastly that the radius of curvature of the fluorescent face P1 of the face panel 8a of the projection tube is 350 mm, and the thickness of the face panel of the projection tube on the optical axis is 14.10 mm, and the refractive index thereof is 1.56232. The transparent medium described in each table indicates the aforementioned liquid coolant 7.

With respect to the surfaces S1 and S2 of the first lens 1, the surfaces S3 and S4 of the second lens 2, the surfaces S7 and S8 of the fourth lens 4, the surfaces S9 and S10 of the fifth lens 5, and the surface S11 of the sixth lens 6, aspherical coefficients are shown.

The aspherical coefficients are constants when the profile of lens surface is expressed by the following equation. The exponent expression in each table uses a base of 10.

$$Z(r) = \frac{r^2/RD}{1+\sqrt{1-(1+CC)r^2/RD^2}} + AE \cdot r^4 + AF \cdot r^6 + AG \cdot r^8 + AH \cdot r^{10} + \ldots + A \cdot r^{2n}$$ (Equation 1)

where RD, CC, AE, AF, AG, AH, - - - , and A indicate arbitrary constants and n indicates an arbitrary natural number. S5 and S6 indicate surfaces of the third lens 3. S13 indicates a surface of the face panel of the projection tube and S12 indicates another surface of the sixth lens 6.

Figure 5:
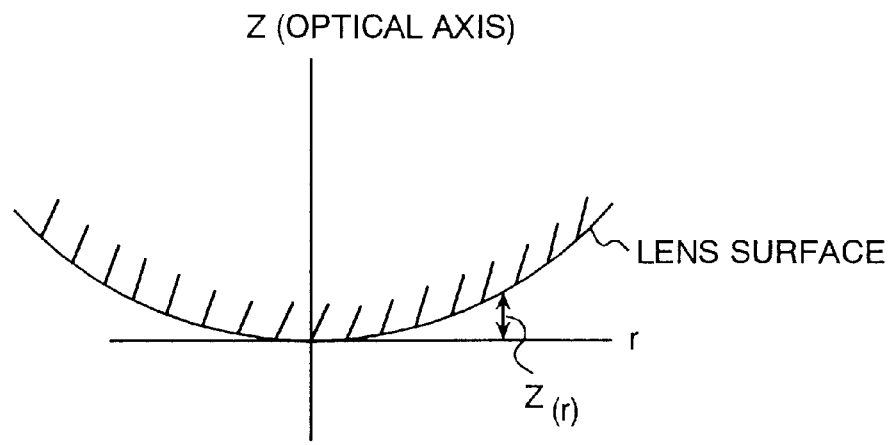
FIG. 5 is a drawing showing the definition of the axes of coordinates in the equation of the profile of lens surface.

FIG. 5 is a drawing showing the definition of the axes of coordinates in Equation 1 of the aforementioned profile of lens surface, and the direction of optical axis from the screen toward the image generating source is set as a Z axis, and the radial direction of lens is set as an r axis. In this case, Z(r) indicates the height of lens surface (surface sag). r indicates the distance from the optical axis of the system, and RD indicates the radius of curvature, and CC indicates a conic constant. Therefore, when each coefficient such as CC, AE, AF, AG, and AH is given, the height of lens surface (hereinafter referred to as the surface sag), that is, the profile is decided according to the aforementioned equation.

Figure 6:
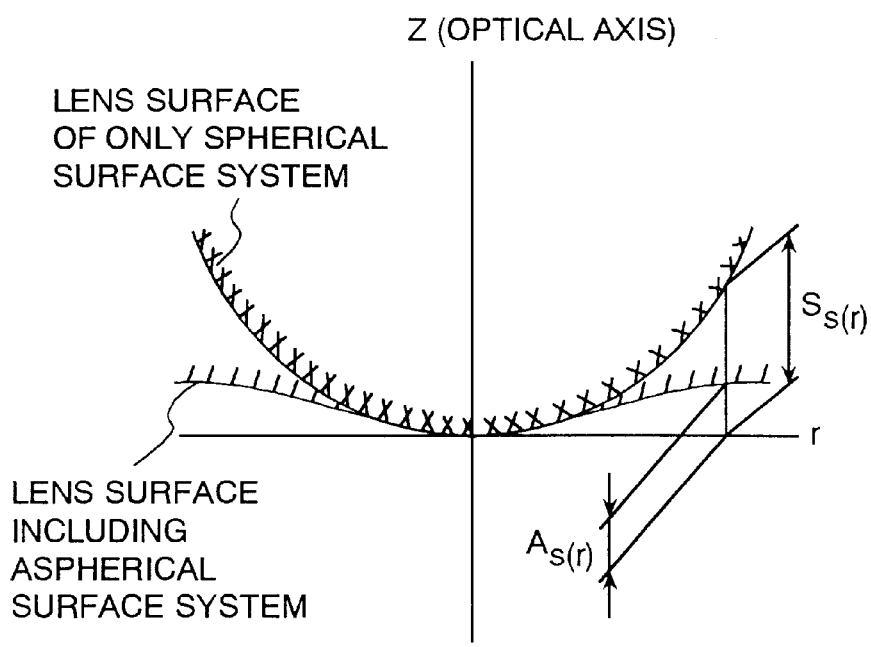
FIG. 6 is an illustration for explaining differences between the aspherical surface and the spherical surface.

FIG. 6 is an illustration for explaining differences between the aspherical surface and the spherical surface. In FIG. 6, As(r) indicates a value which is obtained by substituting the values of respective coefficients in Equation 1 of the profile of lens surface Z(r) and Ss(r) indicates a value when only the radius of curvature RD is substituted in Equation 1 of the profile of lens surface Z(r) and the other coefficients are set to 0. As the absolute value of the ratio ((As(r)−Ss(r))/Ss(r)) of the difference of these values (As(r)−Ss(r)) to Ss(r) increases, the degree of the aspherical surface increases in strength.

The above is how to read the data shown in Table 1. With respect to Tables 2 to 10, how to read is the same.

Next, the action of each lens group of the projection lens system of the present invention will be explained hereunder.

The first lens 1 has a concave profile in the marginal area as shown in FIGS. 2, 3, and 4 and corrects the spherical aberration for the light flux (upper ray RAY1, lower ray RAY2) from an object A on the axis and the coma aberration for the light flux (upper ray RAY3, lower ray RAY4) from an object B in the marginal area. The location (the marginal area of the lens apart from the optical axis of the lens surface on the screen side) through which the light from the upper ray RAY3 to the lower ray RAY4 passes has a profile of aspherical surface which is concave on the screen side.

The second lens 2 has a profile of aspherical surface so that the marginal area of the lens apart from the optical axis of the lens surface on the screen side is convex on the screen side as shown in FIGS. 2, 3, and 4 so as to correct astigmatism and coma aberration. When this lens is combined with the first lens 1, the system is structured so that the negative refractive power on the basis of the lens profile (concave) in the marginal area of the first lens and the positive refractive power on the basis of the lens profile (convex) in the marginal area of the second lens offset each other. Therefore, even if both lens are plastic products, the lowering of the focus performance of the projection lens system due to changes in temperature and absorption of moisture can be suppressed as much as possible.

The third lens 3 is made of glass so as to reduce the drift of the focus performance due to temperature changes and structured so as to increase the positive refractive power as much as possible. According to this embodiment, to reduce the production cost of the projection lens system, SK5 which is inexpensive optical glass is used.

The fourth lens 4 has a meniscus profile which is concave on the screen side as shown in FIGS. 2, 3, and 4 or a lens profile which is concave on both sides (the embodiments shown in Tables 6 and 7) in the center area thereof and has an aspherical surface profile which is a meniscus profile which is concave on the screen side in the marginal area thereof.

For the light flux (upper ray RAY1, lower ray RAY2) from the object point A on the axis, the fourth lens 4 corrects the spherical aberration by the concave profile in the marginal area of lens and reduces the chromatic aberration in combination with the third lens 3 by using a high dispersion material having an Abbe's number of 45 or less.

On the other hand, the fourth lens 4 of the present invention is a lens element with an almost uniform thickness as a whole due to the aforementioned aspherical surface profile and for example, even if a plastic material having poor fluidity for molding such as PC (polycarbonate) is used, a high profile accuracy can be obtained. Furthermore, the lens profile of the fourth lens 4 is a lens profile that the neighborhood of the optical axis has a concave meniscus profile whose concave surface faces the screen side and that particularly with respect to the lens surface on the projection tube side, the inclination of the lens surface in the marginal area of lens apart from the optical axis is large and the lens surface is almost parallel with the lens surface on the screen side. As a result, as shown in FIGS. 2 to 4, the upper ray (RAY1, RAY2) of the light flux generated from the object point A on the optical axis can be shifted toward the optical axis. Therefore, the light entry height into the third lens (glass) is lowered and the diameter of a glass lens can be smaller than that is when the same F-number is obtained without the fourth lens. As a result, the cost of a glass lens can be reduced.

Furthermore, since the inclination of the lens surface in the marginal area of the fourth lens 4 is large, the incident angle into the third lens 3 is increased and the refractive power of the third lens 3 is decreased. Therefore, an inexpensive glass material with a refractive index nd of 1.6 or less can be used for the third lens and the cost can be reduced.

The fifth lens 5 corrects coma aberration of higher order generated by the light flux (upper ray RAY3, lower ray RAY4) from the object point B in the marginal area as shown in FIGS. 2, 3, and 4, so that the profile in the neighborhood of the location (the marginal area of the lens surface on the projection tube side which is an image generating source) through which the lower ray RAY4 passes is an aspherical surface profile which is concave on the projection tube side. The profile in the neighborhood of the location through which the upper ray RAY3 passes is also an aspherical surface profile which is concave locally on the screen side.

Therefore, the lens surface of this lens on the projection tube side has an aspherical surface profile in which the neighborhood of the optical axis is convex on the projection tube side and the marginal area is concave on the projection tube side as a whole. To suppress the lowering of the focus performance of the projection lens system due to changes in temperature and absorption of moisture as much as possible, the refractive power is made as small as possible.

The sixth lens 6 corrects the curvature of field accompanied by the fluorescent face P1. The fluorescent face P1 is a spherical fluorescent face unlike the prior art 2, so that as shown in FIGS. 2, 3, and 4, the aspherical surface profile of the lens surface of the sixth lens 6 on the screen side is a profile that the refractive power in the area through which the light flux (upper ray RAY3, lower ray RAY4) from the object point B in the marginal area passes is weaker than the refractive power in the neighborhood of the optical axis and the sixth lens 6 corrects the astigmatism at the same time.

Figure 7:
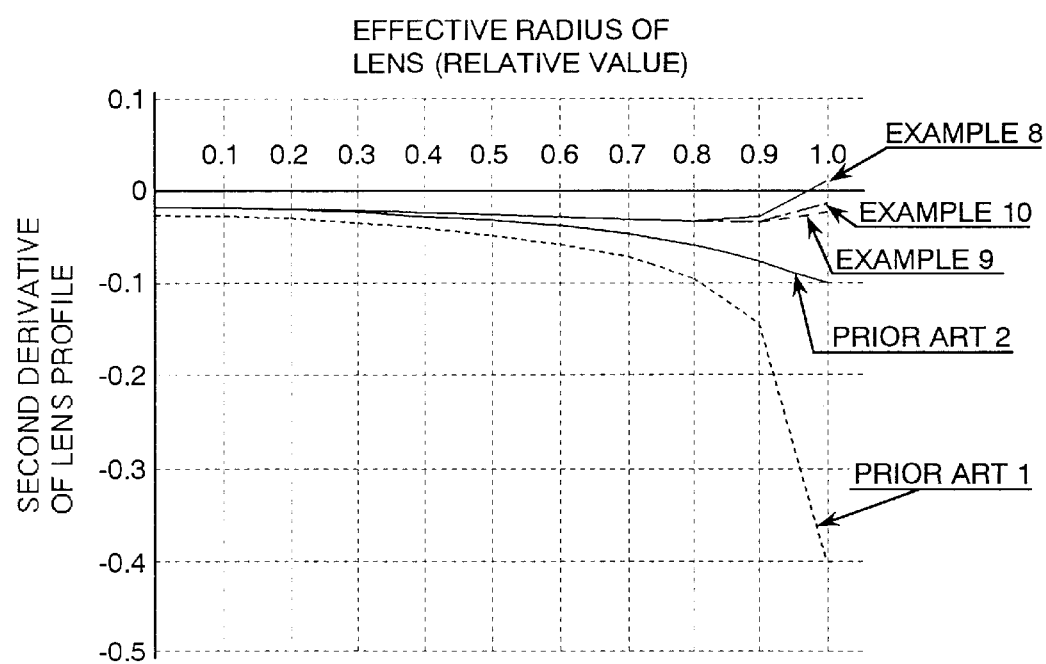
FIG. 7 is a characteristic diagram showing second derivative values of the function indicating the aspherical surface profile of the lens surface of the sixth lens 6 on the screen side.

FIG. 7 is a characteristic diagram in which values obtained by substituting a distance of r from the optical axis in a second derivative obtained by differentiating the function indicating the profile of aspherical surface of the lens surface of the sixth lens 6 on the screen side quadratically are graphed. On the lens surfaces by the first prior art (prior art 1) and the second prior art (prior art 2) mentioned above, the absolute values of derivative values between the optical axis and the marginal area of the lens increase monotonously. This shows that the refracting action of the lens increases monotonously from the optical axis toward the marginal area of the lens. On the other hand, in the embodiments of the present invention, a value obtained in the same way has a point of inflection as shown in Embodiment 8 or reduces in an area more than 70% of the effective radius as shown in Embodiments 9 and 10. As a result, it is found that the refracting action of the lens increases once from the optical axis toward the marginal area and decreases thereafter.

Figure 8:
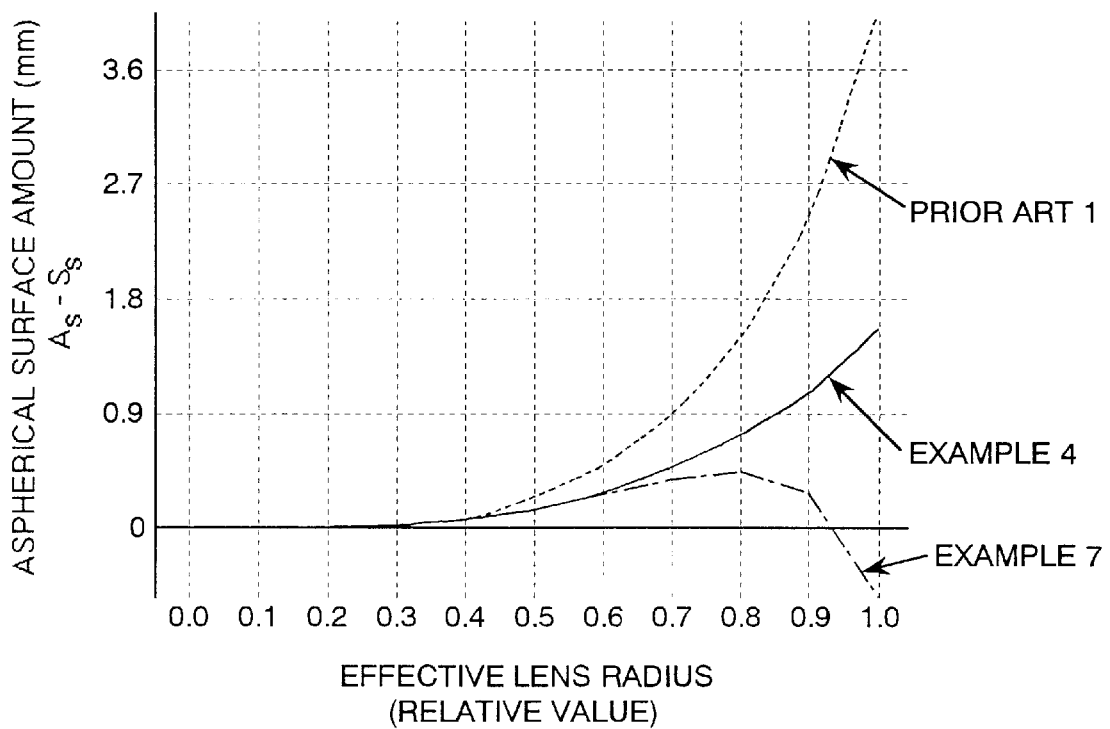
FIG. 8 is a characteristic diagram showing a deviation of the aspherical surface profile of the lens surface of the sixth lens 6 on the screen side from the spherical surface profile.
Figure 9:
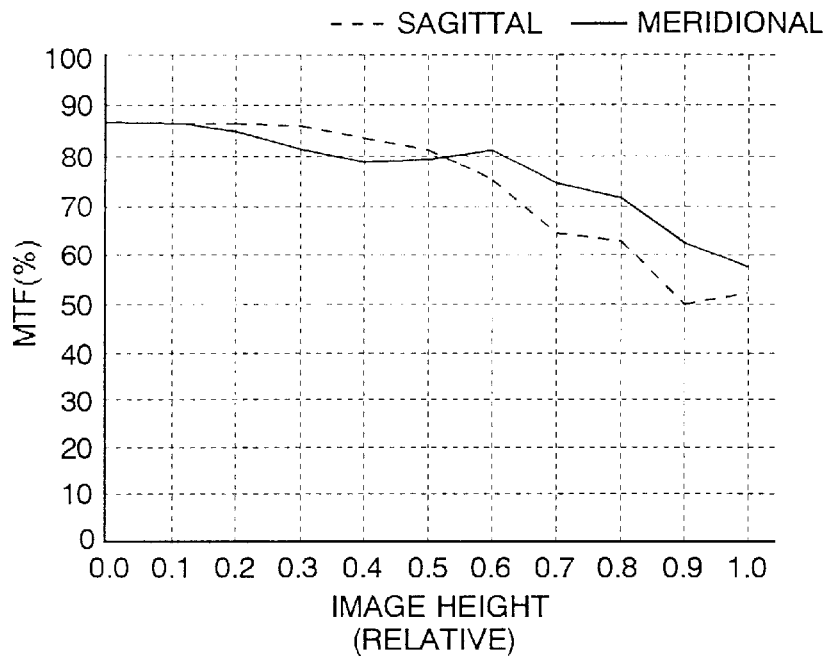
FIG. 9 is an MTF characteristic diagram showing the focus performance of Embodiment 1 of the projection lens system of the present invention.
Figure 10:
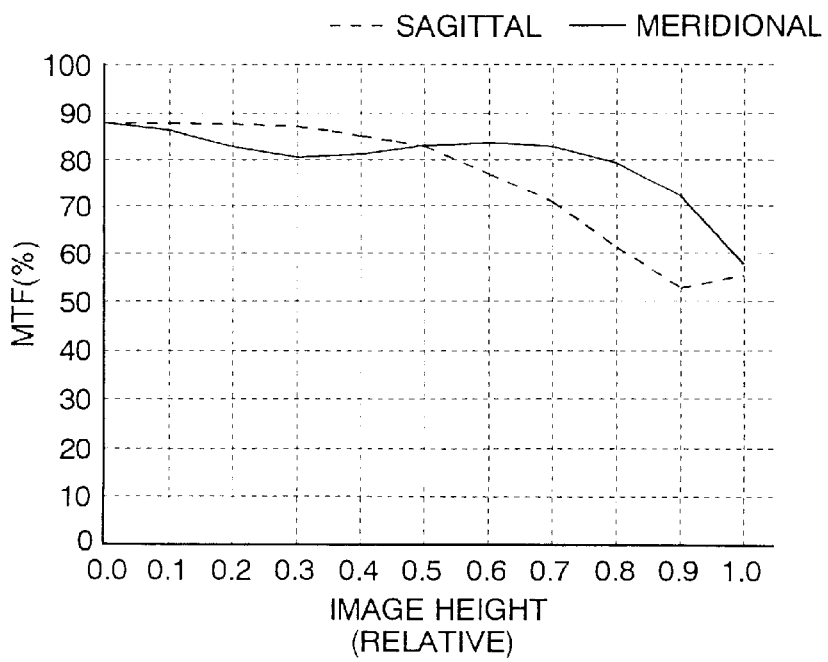
FIG. 10 is an MTF characteristic diagram showing the focus performance of Embodiment 2 of the projection lens system of the present invention.
Figure 11:
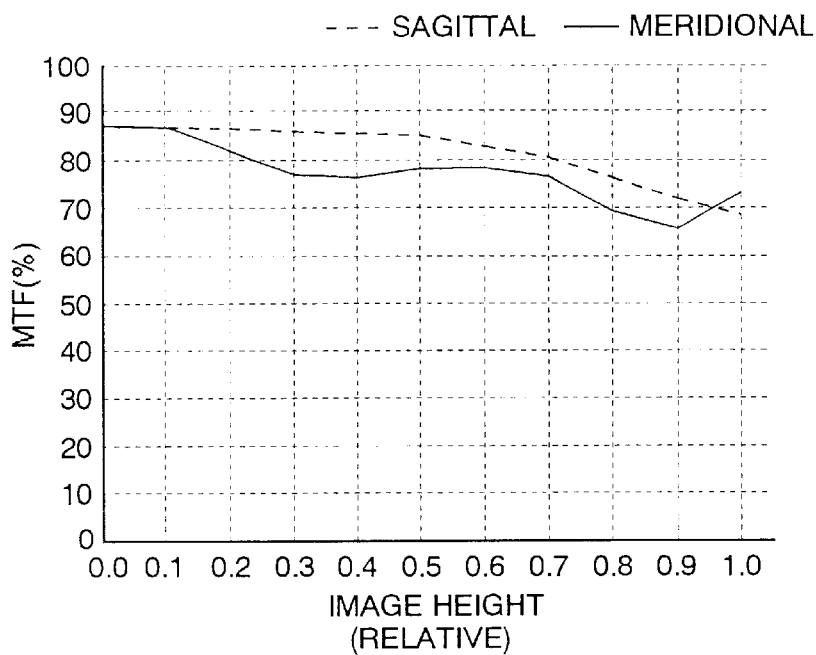
FIG. 11 is an MTF characteristic diagram showing the focus performance of Embodiment 3 of the projection lens system of the present invention.
Figure 12:
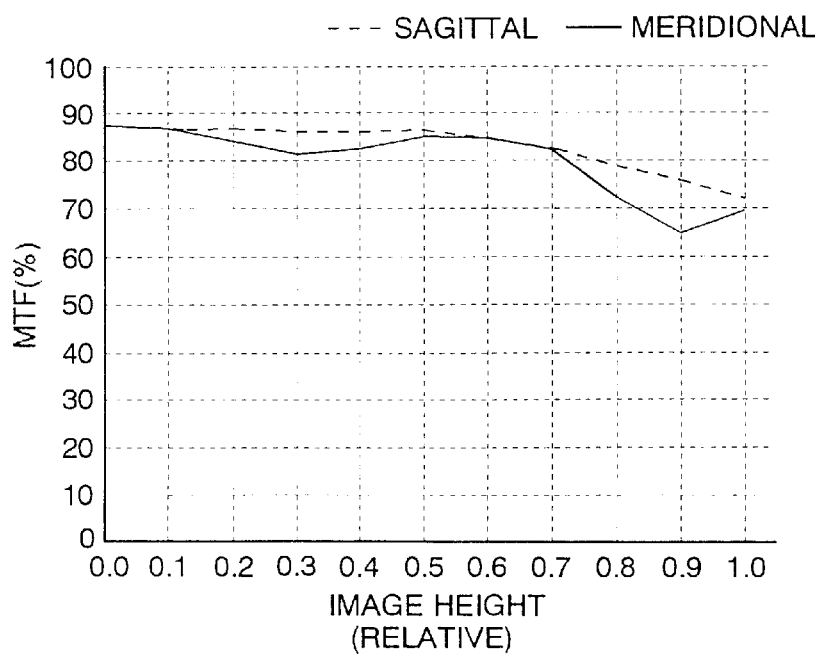
FIG. 12 is an MTF characteristic diagram showing the focus performance of Embodiment 4 of the projection lens system of the present invention.
Figure 13:
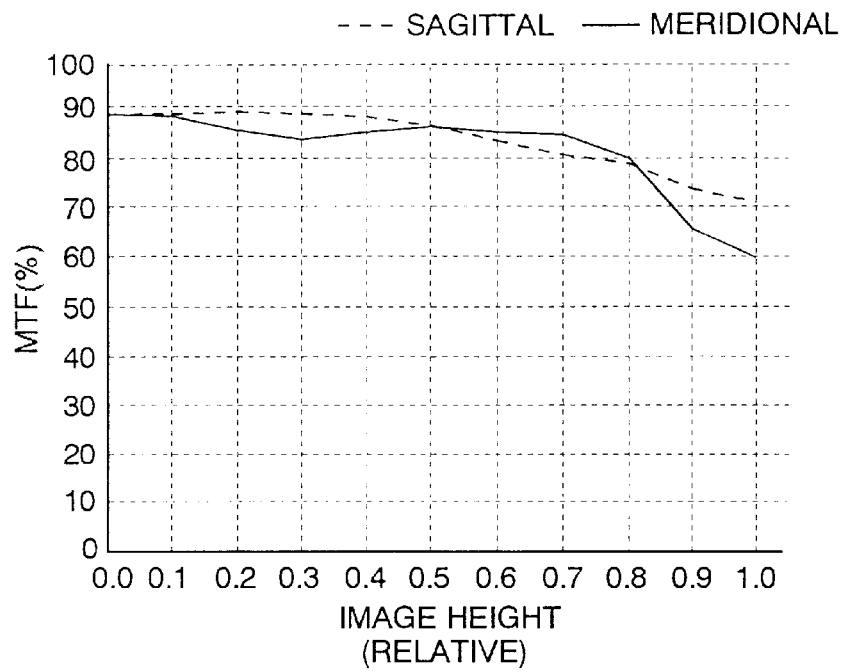
FIG. 13 is an MTF characteristic diagram showing the focus performance of Embodiment 5 of the projection lens system of the present invention.
Figure 14:
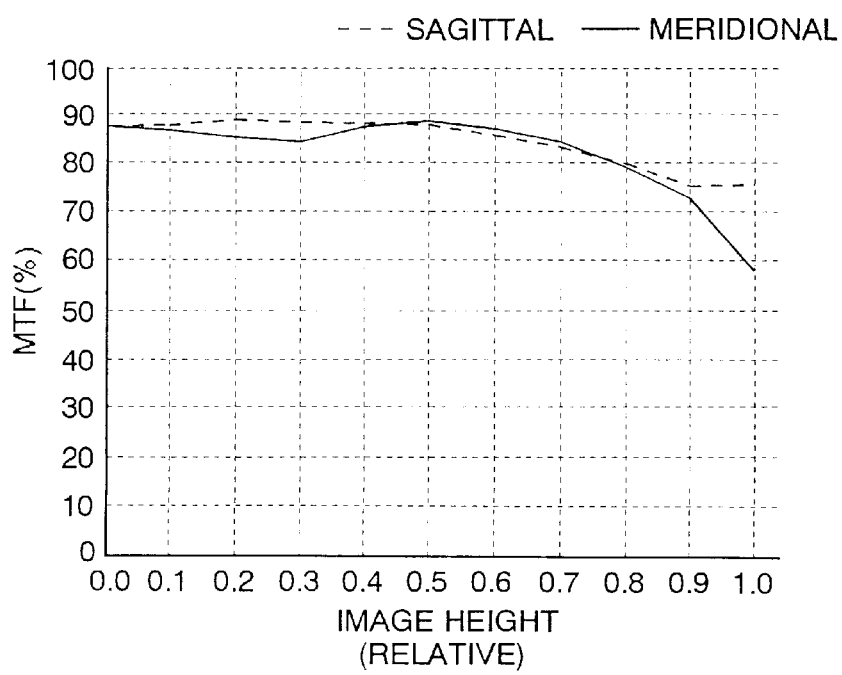
FIG. 14 is an MTF characteristic diagram showing the focus performance of Embodiment 6 of the projection lens system of the present invention.
Figure 15:
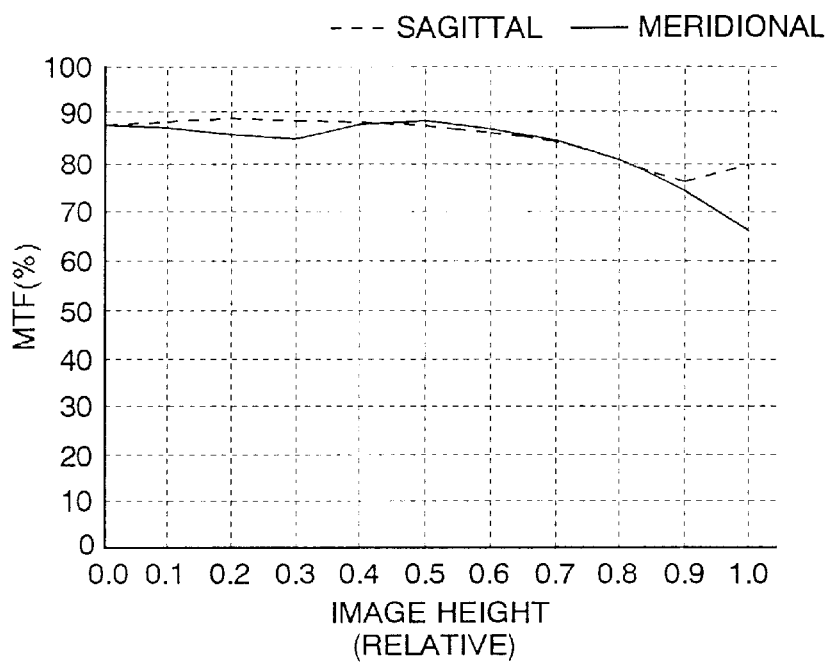
FIG. 15 is an MTF characteristic diagram showing the focus performance of Embodiment 7 of the projection lens system of the present invention.
Figure 16:
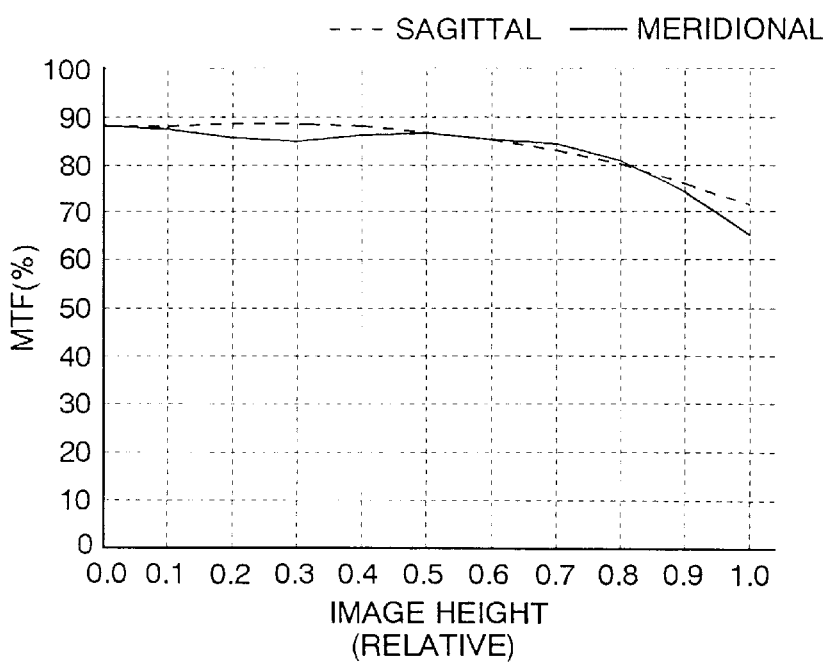
FIG. 16 is an MTF characteristic diagram showing the focus performance of Embodiment 8 of the projection lens system of the present invention.
Figure 17:
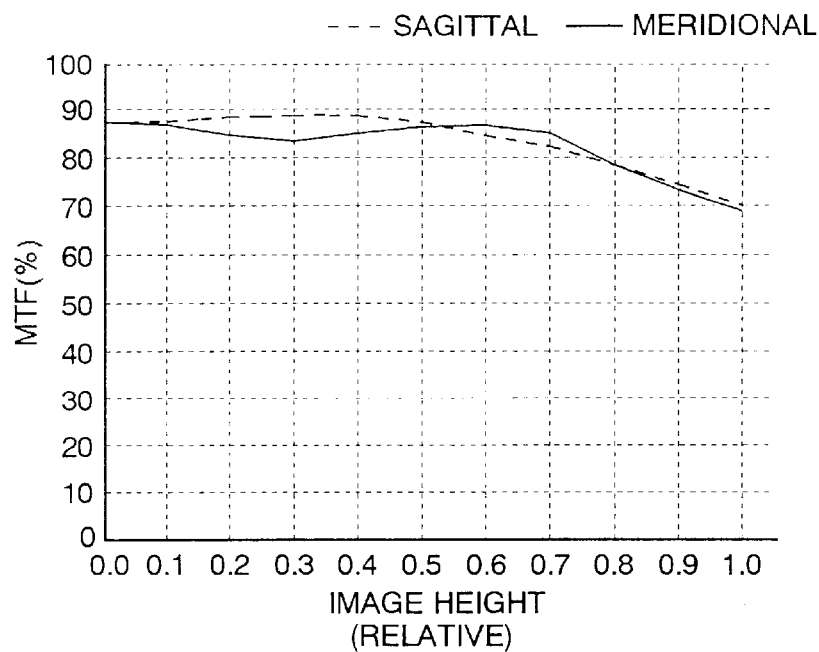
FIG. 17 is an MTF characteristic diagram showing the focus performance of Embodiment 9 of the projection lens system of the present invention.
Figure 18:
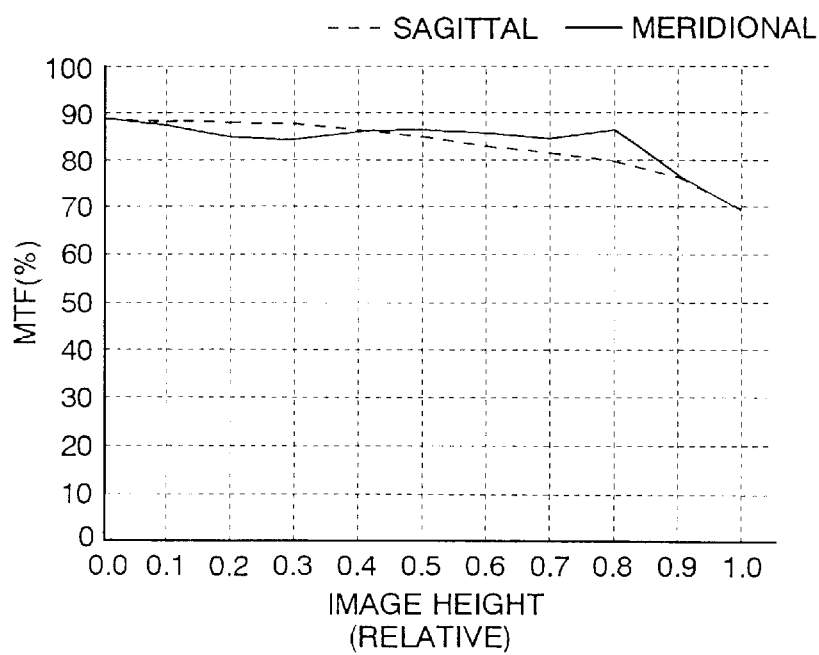
FIG. 18 is an MTF characteristic diagram showing the focus performance of Embodiment 10 of the projection lens system of the present invention.

FIG. 8 is a characteristic diagram in which the distance of the aspherical surface profile of the lens surface of the sixth lens 6 on the screen side from the lens surface Ss(r) only of the spherical surface system is obtained by calculation. The horizontal axis shown in FIG. 8 indicates a relative value of the aforementioned distance r to the effective lens radius and the vertical axis indicates a difference between As(r) and Ss(r). In comparison with the first prior art (prior art 1 shown in the drawing), in the embodiments of the present invention, the difference between As(r) and Ss(r) is small such as about ½ of that in prior art 1 or less and the marginal area of the sixth lens 6 is not thick but almost uniform in thickness, so that satisfactory moldability can be obtained.

FIGS. 9 to 18 are characteristic diagrams showing evaluation results of the focus performance by the MTF (modulation transfer function) when rasters with a diagonal of 5.33 inch are displayed on the fluorescent face of the projection tube using the aforementioned projection lens system of the present invention and enlarged and displayed on the screen (60 inch) and correspond to Embodiments 1, 2, 3, - - - , and 10 sequentially. The horizontal axis in these drawings indicates a relative image height from center on the screen.

As a spatial frequency as an evaluation condition, a case that 300 TV lines are taken as a stripe signal of white and black on the screen, that is, 150 pair lines are taken for the longitudinal dimension of the screen is shown. As shown in these drawings, by the projection lens system having this constitution, a satisfactory MTF characteristic can be obtained.

On the other hand, when three primary-color projection tube of red, green, and blue are used as projection tubes which is image generating sources, the spurious component other than the dominant wave length component is generally included in the light emission spectrum of the phosphorescent substance of each projection tube.

Figure 19:
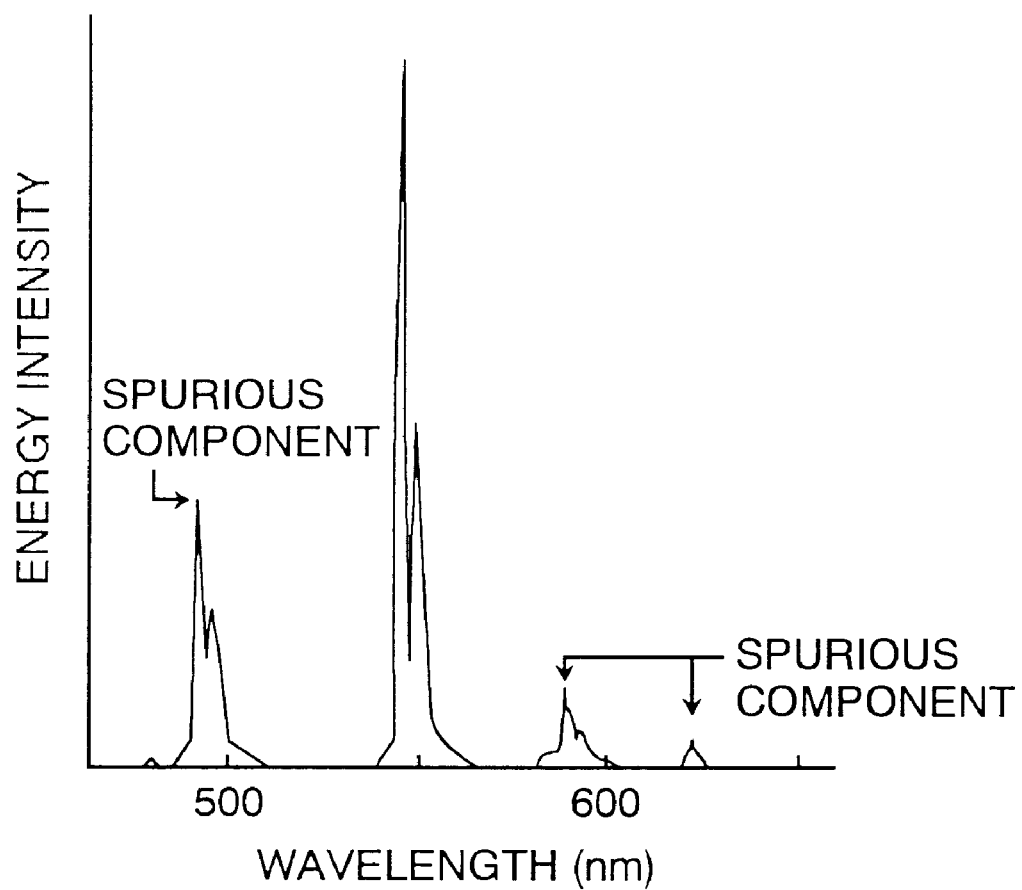
FIG. 19 is a characteristic diagram showing an example of general light emission spectrum characteristics of green phosphorescent substance.

FIG. 19 is a characteristic diagram showing an example of the light emission spectrum of a general green phosphorescent substance. In the green light emission spectrum shown in FIG. 19, a spurious component of several wave lengths can be seen in addition to a dominant wave length component of 545 nm.

If a filter for cutting the aforementioned spurious component is installed in at least one of the lens elements constituting the projection lens system so as to reduce the generated chromatic aberration itself, a more satisfactory focus performance can be obtained.

Next, power distribution to each lens group in the aforementioned embodiments of the projection lens system of the present invention will be explained.

Table 11 is a table showing power distribution when the focal length of the overall projection lens system is assumed as f0 and the focal lengths of the first lens 1, second lens 2, third lens 3, fourth lens 4, fifth lens 5, and sixth lens 6 are assumed as f1, f2, f3, f4, f5, and f6 respectively in the embodiments of the present invention shown in Tables 1 to 10.

The ranges of power distribution shown in Table 11 are shown below.

$0.24 < f_0/f_1 < 0.35$
$0.0 < f_0/f_2 < 0.18$
$0.78 < f_0/f_3 < 0.91$
$-0.20 < f_0/f_4 < 0.0$
$0.0 < f_0/f_5 < 0.21$
$-0.61 < f_0/f_6 < -0.55$

According to this embodiment, by sharing the greater part of the positive refractive power of the overall projection lens system by the third lens which is a glass lens element, the drift of the focus performance by temperature change is reduced.

TABLE 11

| Lens No. | Lens power distribution | | | | | | Focal length $f_0$ (mm) |
|---|---|---|---|---|---|---|---|
| | $f_0/f_1$ | $f_0/f_1$ | $f_0/f_3$ | $f_0/f_4$ | $f_0/f_5$ | $f_0/f_6$ | |
| 1 | 0.3343 | 0.00121 | 0.8617 | −0.0783 | 0.2008 | −0.5550 | 90.486 |
| 2 | 0.3489 | 0.00121 | 0.8624 | −0.0781 | 0.1871 | −0.5544 | 90.310 |
| 3 | 0.2587 | 0.1021 | 0.9041 | −0.0785 | 0.0799 | −0.5640 | 90.775 |
| 4 | 0.2510 | 0.1749 | 0.7875 | −0.0774 | 0.1854 | −0.6037 | 89.473 |
| 5 | 0.2893 | 0.0527 | 0.8977 | −0.0780 | 0.1135 | −0.5602 | 90.130 |
| 6 | 0.2555 | 0.1283 | 0.8889 | −0.1940 | 0.1798 | −0.5734 | 90.276 |
| 7 | 0.2442 | 0.1352 | 0.8755 | −0.1981 | 0.2016 | −0.5773 | 90.339 |
| 8 | 0.2909 | 0.0527 | 0.8974 | −0.0780 | 0.1135 | −0.5600 | 90.098 |
| 9 | 0.2936 | 0.0529 | 0.9001 | −0.0782 | 0.1138 | −0.5614 | 90.330 |
| 10 | 0.2888 | 0.0528 | 0.8992 | −0.0781 | 0.1138 | −0.5611 | 90.277 |

$f_0$: Focal length of overall lens system (mm)
$f_1$: Focal length of first lens (mm)
$f_2$: Focal length of second lens (mm)
$f_3$: Focal length of third lens (mm)
$f_4$: Focal length of fourth lens (mm)
$f_5$: Focal length of fifth lens (mm)
$f_6$: Focal length of sixth lens (mm)

Next, characteristics of the profile of lens surface will be explained.

The profiles of aspherical surfaces of the lens surface S1 of the first lens 1 on the screen side, the lens surface S8 of the fourth lens 4 on the image generating source side, the lens surface S10 of the fifth lens 5 on the image generating source side, and the lens surface S11 of the sixth lens 6 on the screen side have the following characteristics.

In FIG. 6, As(r) indicates a value which is obtained by substituting the values of respective coefficients in Equation 1 of the profile of lens surface Z(r) and Ss(r) indicates a value when only the radius of curvature RD is substituted in Equation 1 of the profile of lens surface Z(r) and the other coefficients are set to 0. In this case, the value of As(r)/Ss(r) is assumed as an index indicating the degree of the aspherical surface. In this case, the aforementioned ratio of As and Ss of the lens surface S1 of the first lens 1 on the screen side is within the following range as shown in Table 12.

(As/Ss) > −0.1

The aforementioned ratio of As and Ss of the lens surface S8 of the fourth lens 4 on the image generating source side is within the following range as shown in Table 13.

(As/Ss) > −21.2

Furthermore, the aforementioned ratio of As and Ss of the lens surface S10 of the fifth lens 5 on the image generating source side is within the following range as shown in Table 14.

(As/Ss) < −0.6

Furthermore, the aforementioned ratio of As and Ss of the lens surface S11 of the sixth lens 6 on the screen side is within the following range as shown in Table 15.

(As/Ss) < 1.1

Next, the condition for making the light amount ratio of the middle field of the screen satisfactory and some other conditions will be described. Assuming the distance (axial distance between surfaces) on the optical axis between the first lens 1 and the second lens 2 as L 12, the ratio of it to the focal length f0of the overall projection lens system relates to the light amount in the middle field of the screen and the following relation is held as shown in Table 16.

(L 12/f0) < 0.25

Beyond this range, the light amount ratio of the middle field of the screen area is reduced.

The ratio of the distance (axial distance between surfaces) L 12 on the optical axis between the first lens 1 and the second lens 2 to the distance (axial distance between surfaces) L 23 on the optical axis between the second lens 2 and the third lens 3 is decided by the balance of correction of aberration and the following relation is held as shown in Table 16.

(L 12/L 23) > 1.3

Below this range, no satisfactory focus performance can be obtained.

Between the absolute value of radius of curvature Ra3 of the lens surface S5 of the third lens 3 on the screen side and the absolute value of radius of curvature Rb3 of the lens surface S6 of the third lens 3 on the image generating source side, the following relation is held:

|Ra3| < |Rb3|

The reason is that the spherical aberration and coma aberration caused by the third lens 3 are reduced. Between the absolute value of radius of curvature Ra4 of the lens surface S7 of the fourth lens 4 on the screen side and the absolute value of radius of curvature Rb4 of the lens surface S8 of the fourth lens 4 on the image generating source side, the following relation is held:

|Ra4| < |Rb4|

The reason is that the reduction in the share of the positive refractive power to the third lens 3 and the correction of chromatic aberration and spherical aberration are balanced. When a material of an Abbe's number of 45 or less is used for the fourth lens 4, the chromatic aberration can be reduced.

The characteristics of the profile of lens surface are mentioned above on the basis of the lens data of the projection lens system in the embodiments of the present invention.

In this embodiment, the aspherical surfaces using up to the aspherical coefficient of 10th order AH are described. Needless to say, a constitution that a coefficient of 12th order or higher is included is also included in the present invention.

TABLE 12

| Lens No. | Lens surface $S_1$ | | | Effective radius of surface $S_1$ (mm) |
|---|---|---|---|---|
| | As (mm) | Ss (mm) | As/Ss | |
| 1 | 6.861 | 19.164 | 0.358 | 56.0 |
| 2 | 8.846 | 18.227 | 0.485 | 52.7 |
| 3 | 2.023 | 15.968 | 0.127 | 56.0 |
| 4 | 6.381 | 17.763 | 0.359 | 52.7 |
| 5 | 0.773 | 14.855 | 0.052 | 56.0 |
| 6 | −0.402 | 14.460 | −0.028 | 56.0 |
| 7 | −0.693 | 14.620 | −0.047 | 56.0 |
| 8 | 1.801 | 15.176 | 0.119 | 56.0 |
| 9 | 2.397 | 15.358 | 0.156 | 56.0 |
| 10 | 1.074 | 15.286 | 0.070 | 56.0 |

As: Aspherical surface sag amount (mm)
Ss: spherical surface sag amount (mm)

TABLE 13

| Lens No. | Lens surface S$_8$ | | | Effective radius of surface S$_8$ (mm) |
|---|---|---|---|---|
| | As (mm) | Ss (mm) | As/Ss | |
| 1 | −2.759 | −2.461 | 1.121 | 47.0 |
| 2 | −2.386 | −1.781 | 1.340 | 40.0 |
| 3 | −2.239 | −1.781 | 1.257 | 40.0 |
| 4 | −2.950 | −1.781 | 1.656 | 40.0 |
| 5 | −5.032 | −1.781 | 2.825 | 40.0 |
| 6 | −3.409 | 0.161 | −21.18 | 40.1 |
| 7 | −3.376 | 0.201 | −16.80 | 40.1 |
| 8 | −4.202 | −1.781 | 2.359 | 40.0 |
| 9 | −2.657 | −1.781 | 1.492 | 40.0 |
| 10 | −4.196 | −1.781 | 2.356 | 40.0 |

As: Aspherical surface sag amount (mm)
Ss: Spherical surface sag amount (mm)

TABLE 14

| Lens No. | Lens surface S$_{10}$ | | | Effective radius of surface S$_{10}$ (mm) |
|---|---|---|---|---|
| | As (mm) | Ss (mm) | As/Ss | |
| 1 | 2.389 | −3.955 | −0.604 | 42.0 |
| 2 | 2.621 | −3.340 | −0.785 | 40.0 |
| 3 | 5.613 | −1.386 | −4.050 | 40.0 |
| 4 | 2.621 | −3.340 | −0.785 | 40.0 |
| 5 | 4.994 | −2.005 | −2.491 | 40.0 |
| 6 | 3.675 | −2.151 | −1.709 | 38.0 |
| 7 | 3.721 | −2.105 | −1.767 | 38.0 |
| 8 | 4.994 | −2.005 | −2.491 | 40.0 |
| 9 | 4.994 | −2.005 | −2.491 | 40.0 |
| 10 | 4.994 | −2.005 | −2.491 | 40.0 |

As: Aspherical surface sag amount (mm)
Ss: Spherical surface sag amount (mm)

TABLE 15

| Lens No. | Lens surface S$_{11}$ | | | Effective radius of surface S$_{11}$ (mm) |
|---|---|---|---|---|
| | As (mm) | Ss (mm) | As/Ss | |
| 1 | −20.744 | −19.534 | 1.062 | 42.5 |
| 2 | −18.823 | −17.856 | 1.054 | 41.0 |
| 3 | −18.330 | −18.094 | 1.013 | 41.0 |
| 4 | −21.605 | −19.850 | 1.088 | 41.0 |
| 5 | −19.314 | −18.094 | 1.067 | 41.0 |
| 6 | −17.858 | −18.524 | 0.964 | 41.0 |
| 7 | −17.680 | −18.650 | 0.948 | 41.0 |
| 8 | −19.111 | −18.094 | 1.056 | 41.0 |
| 9 | −19.132 | −18.094 | 1.057 | 41.0 |
| 10 | −19.542 | −18.094 | 1.080 | 41.0 |

As: Aspherical surface sag amount (mm)
Ss: Spherical surface sag amount (mm)

TABLE 16

| Lens No. | Focal length F$_0$ (mm) | Axisal distance between lenses | | L$_{12}$/L$_{23}$ | L$_{12}$/f$_0$ |
|---|---|---|---|---|---|
| | | L$_{12}$ (mm) | L$_{23}$ (mm) | | |
| 1 | 90.486 | 15.473 | 8.707 | 1.777 | 0.171 |
| 2 | 90.310 | 20.146 | 4.933 | 4.084 | 0.223 |
| 3 | 90.775 | 18.075 | 9.167 | 1.972 | 0.199 |
| 4 | 89.473 | 13.907 | 10.482 | 1.327 | 0.155 |

TABLE 16-continued

| Lens No. | Focal length F$_0$ (mm) | Axisal distance between lenses | | L$_{12}$/L$_{23}$ | L$_{12}$/f$_0$ |
|---|---|---|---|---|---|
| | | L$_{12}$ (mm) | L$_{23}$ (mm) | | |
| 5 | 90.130 | 17.286 | 8.149 | 2.121 | 0.192 |
| 6 | 90.276 | 17.162 | 5.811 | 2.954 | 0.190 |
| 7 | 90.339 | 17.162 | 5.079 | 3.379 | 0.190 |
| 8 | 90.098 | 17.431 | 7.842 | 2.223 | 0.194 |
| 9 | 90.330 | 16.778 | 10.013 | 1.676 | 0.186 |
| 10 | 90.277 | 16.478 | 8.988 | 1.833 | 0.183 |

L$_{12}$: Axial distance between first lens group and second lens group
L$_{23}$: Axial distance between second lens group and third lens group
f$_0$: Focal length of overall projection lens system Next, a method that in the projection lens system of the present invention, at least one communicating opening or communicating window extending outside of the projection lens system from the spaces between the lens elements is installed and that even if the heat quantity generated from the image generating source is large, the air temperature in the sealed space inside the lens barrel and the temperature of the lens elements are prevented from rising will be explained.

Figure 20:
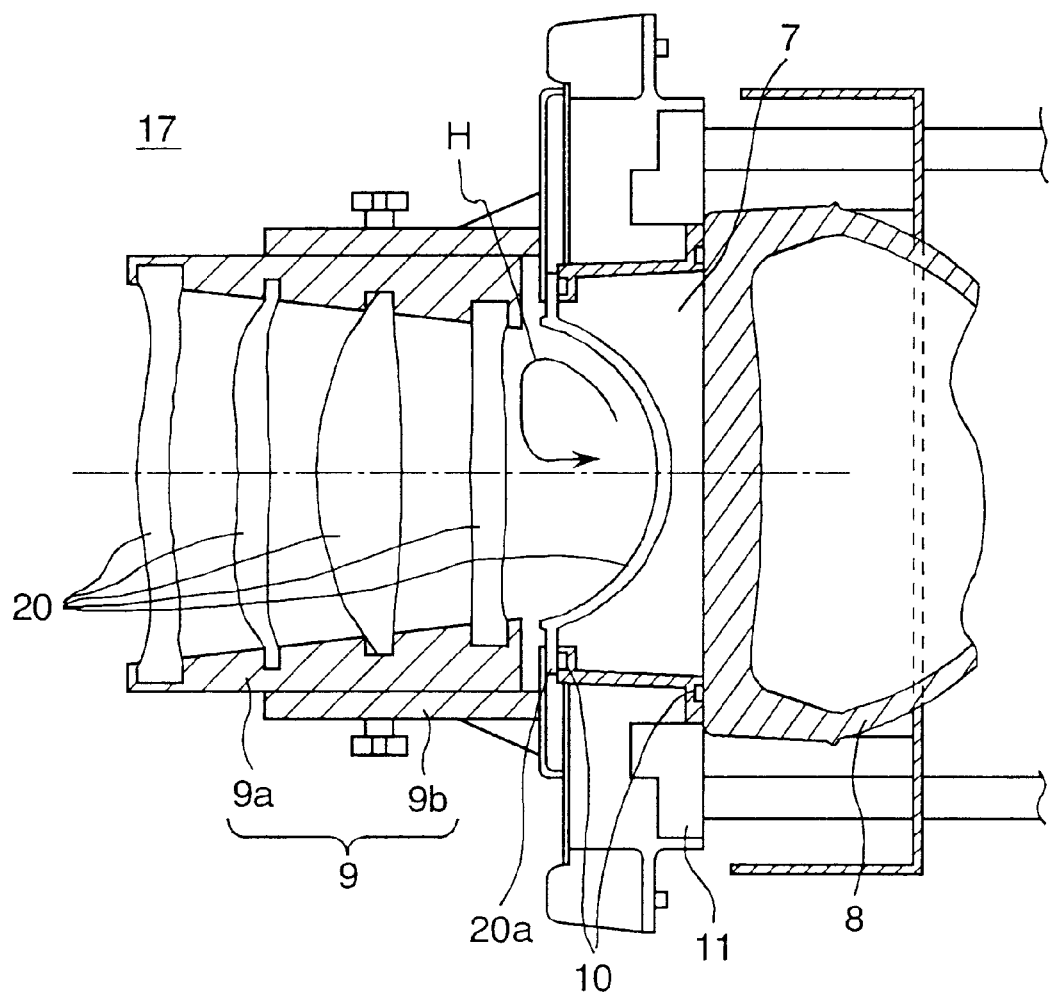
FIG. 20 is a cross sectional view showing the essential section of an example of a projection lens system of the prior art.

FIG. 20 is a cross sectional view showing the essential section of an example of a projection lens system of the prior art.

In FIG. 20, numeral 17 indicates a projection lens system, 8 a projection type cathode ray tube as an image generating source, 7 a liquid coolant, 20 lens elements, 9 a lens barrel as a lens element holding member, 11 a bracket as a connection member, and 10 elastic bodies. The lens barrel 9 has an inner barrel 9a and an outer barrel 9b and the lens elements 20 except the lens element 20a which is closest to the projection type cathode ray tube 8 are held in the inner barrel 9a with high precision. Both the lens element 20a and the projection type cathode ray tube 8 are pressed and held by the bracket 11 by a suitable holding means via the elastic bodies 10 and the liquid coolant 7 is sealed in the space surrounded by the lens element 20a, the projection type cathode ray tube 8, and the bracket 11. At this time, the inside of the lens barrel 9 is a sealed structure practically. As a result, by the heat generated by the projection type cathode ray tube 8 which is an image generating source, the lens element 20a closest to the projection type cathode ray tube 8 and the air in the space between the lens element 20a and the lens element 20b second closest to the projection type cathode ray tube 8 are heated sequentially and furthermore, the temperature of the overall lens elements 20 and the air temperature in the sealed spaces between the lens elements rise gradually. This heat is radiated outside the projection lens system 17 almost only by heat transfer from the outer surface of the bracket 11, the outer surface of the lens barrel 9, and the outer surface of the lens element farthest away from the projection type cathode ray tube 8 among the lens elements 20. However, the material of lens elements is generally glass or plastics and when the lens barrel 9 is made of plastics from the point of view of moldability, the heat transfer coefficient from these outer surfaces is smaller than the heat transfer coefficient from the metal surface, so that the heat radiation amount is smaller than the exothermic amount of the projection type cathode ray tube 8 and others and the air temperature in the sealed spaces and the temperature of the lens elements rise furthermore. As a result, a problem arises that the heated lens elements are expanded or deformed and hence the focus performance of the projection lens system is extremely lowered. Therefore, it is a subject for design to suppress rising of the air temperature in the sealed space in the lens barrel and the temperature of the lens elements and to prevent the lens elements from expansion and deformation even if the heat quantity from the image generating source is large.

Figure 21:
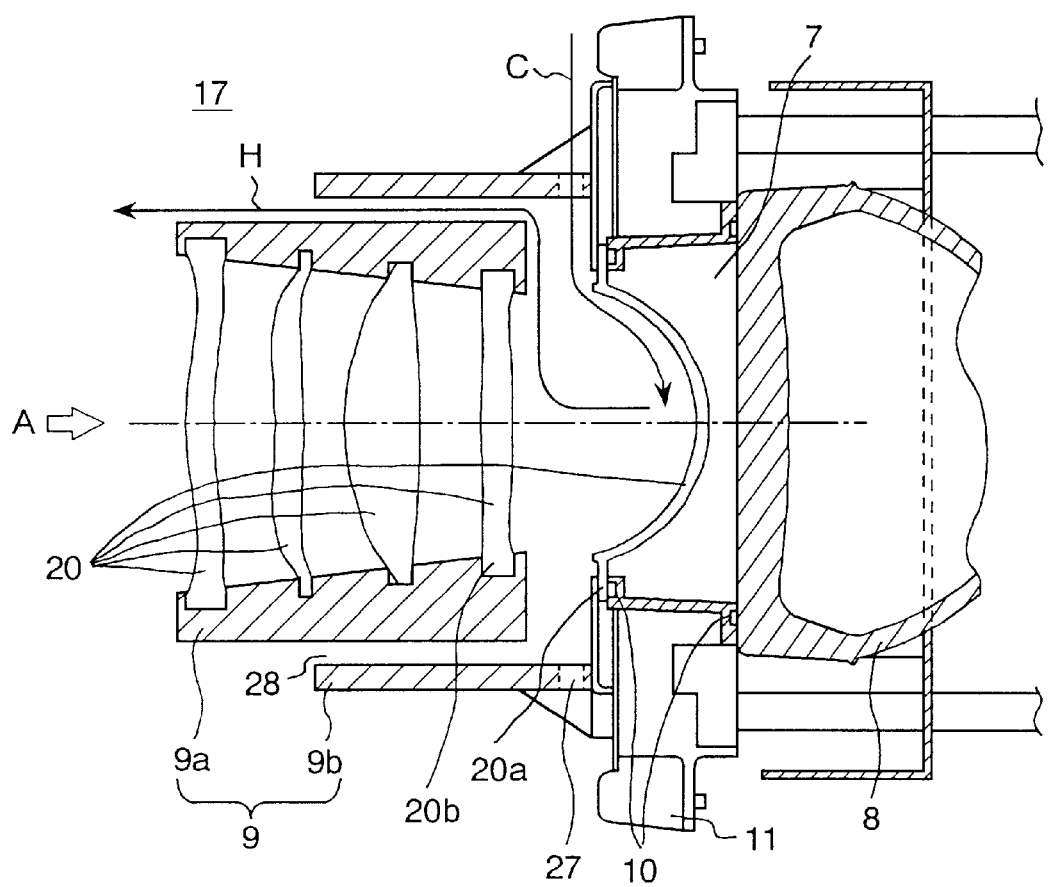
FIG. 21 is a cross sectional view showing the essential section of the 11th embodiment of the projection lens system of the present invention.

FIG. 21 is a cross sectional view showing the essential section of the 11th embodiment of the projection lens system 17 of the present invention and the same numeral is assigned to the part which is equivalent to a part shown in FIG. 20. The lens barrel 9 has an inner barrel 9a and an outer barrel 9b holding the inner barrel 9a in the slidable state and the lens elements 20 except the lens element 20a which is closest to the projection type cathode ray tube 8 are held in the inner barrel 9a with high precision.

In FIG. 21, in the outer barrel 9b of the lens barrel 9, at least one communicating opening (a communicating window when the overall length of the opening is short) 27 for connecting the inside of the lens barrel 9 and the outside of the projection lens system is installed.

Figure 22:
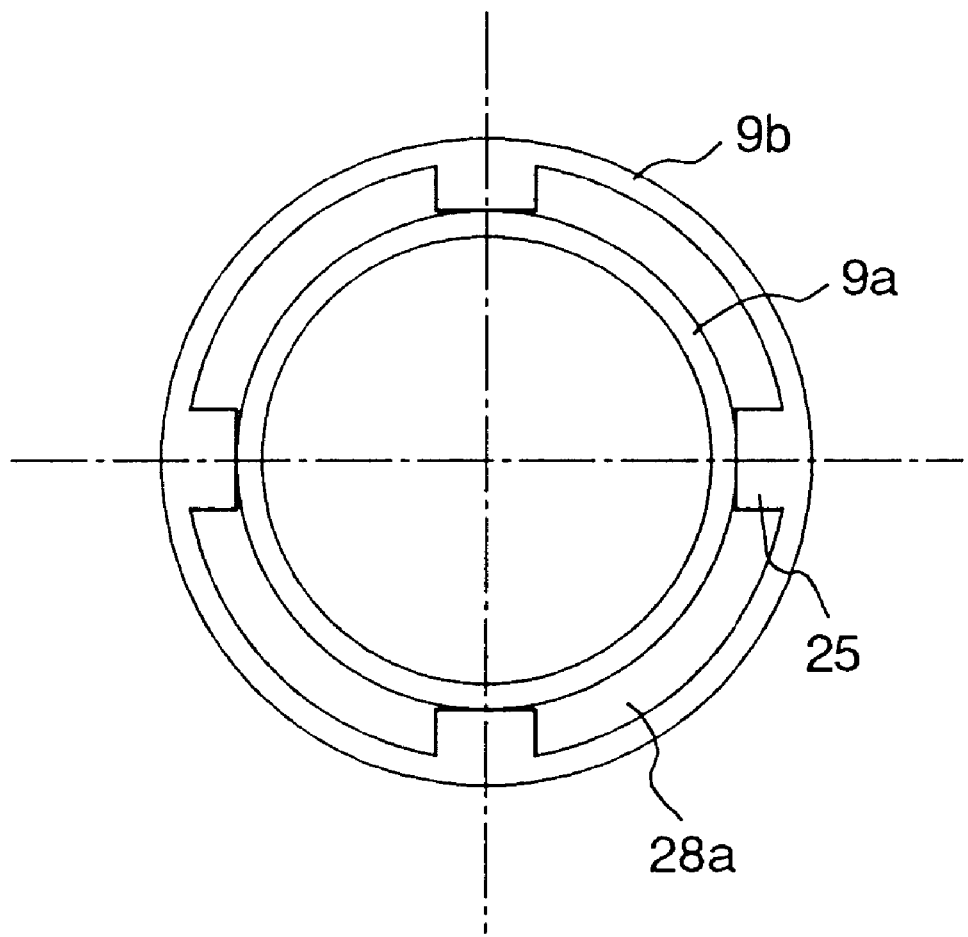
FIG. 22 is a cross sectional view showing the essential section when the cross section of the lens barrel 9 of the projection lens system shown in FIG. 21 is seen in the direction of the arrow A.

FIG. 22 is a cross sectional view showing the essential section when the cross section of the lens barrel 9 of the projection lens system 17 shown in FIG. 21 is seen in the direction of the arrow A. The inner barrel 9a is fitted and held by a plurality of fitting protrusions 25 installed on the inner surface of the outer barrel 9b and grooves 28a between the fitting protrusions 25 become a second communicating opening 28. In FIG. 22, the fitting protrusions 25 on the inner surface side of the outer barrel 9b are structured so that they are arranged at four locations on a cross section perpendicular to the optical axis. However, the present invention is not limited to this constitution. For example, the number of arrangement locations of the fitting protrusions 25 may be 3 or any other number. These fitting protrusions 25 may be in a shape that they are cut into pieces in the direction of the optical axis and any constitution that the inner barrel 9a can slide inside the outer barrel 9b smoothly and that the grooves 28a can fulfill the function as a communicating opening fully is acceptable.

In this constitution, when the projection lens system is actually used, for example, when it is incorporated and used in a rear projection type image display apparatus, the right side (the projection type cathode ray tube side) of FIG. 21 is generally located low and the left side (the lens element side) is generally located up, so that the location of the second communicating opening 28 is generally higher than the location of the first communicating opening 27. Therefore, low-temperature air C (open air) introduced from the first communicating opening 27 is heated by the projection type cathode ray tube 8 in the space between the lens element 20a closest to the projection type cathode ray tube 8 and the lens element 20b second closest to it, and the temperature thereof rises, and the air becomes light due to volume expansion. Air H which is heated and lightened flows out of the second communicating opening 28. The lens elements 20 radiate heat efficiently by repetition of this series of phenomena, so that the expansion and deformation thereof can be suppressed and the focus performance of the projection lens system can be prevented from lowering.

Figure 23:
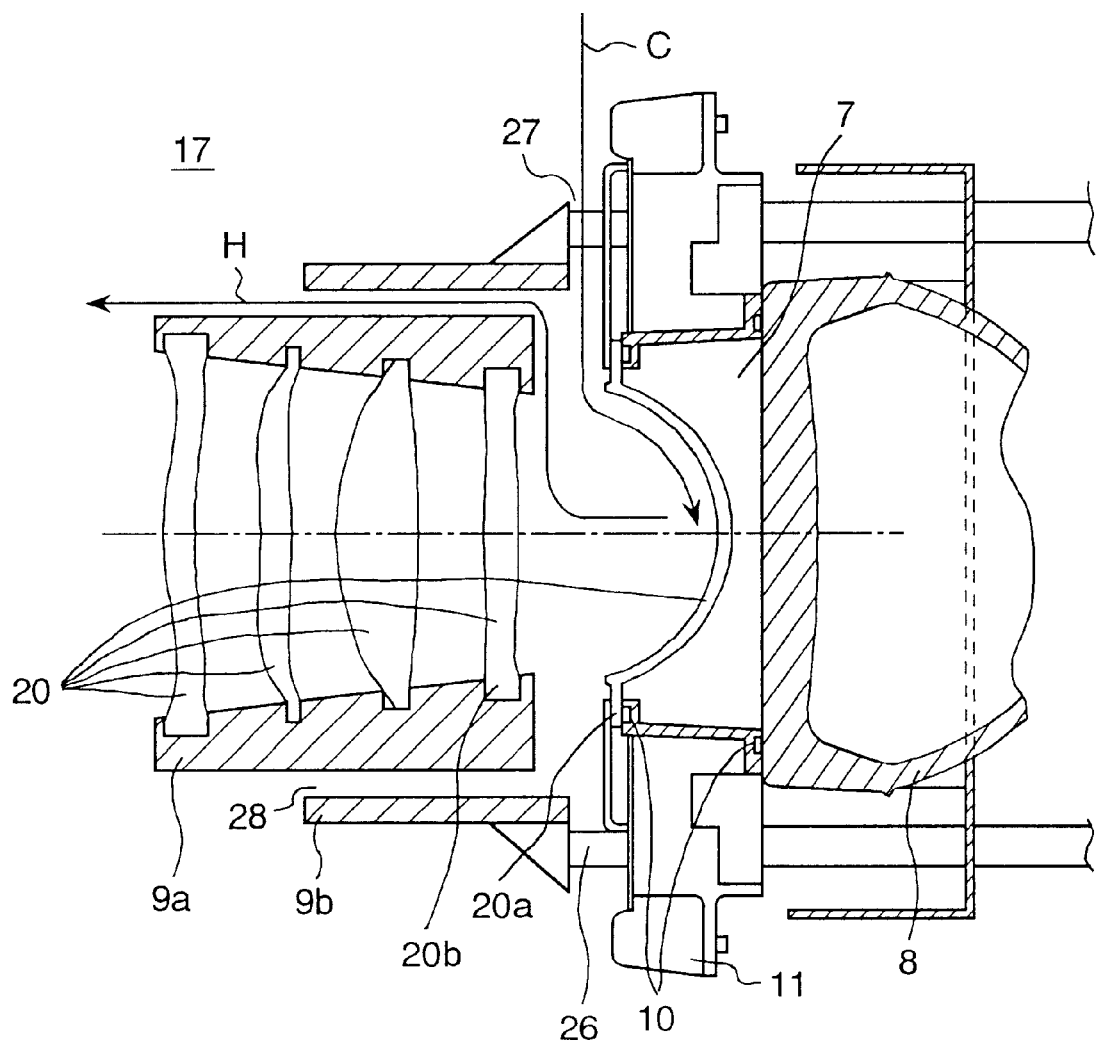
FIG. 23 is a cross sectional view showing the essential section of the 12th embodiment of the projection lens system of the present invention.

FIG. 23 is a cross sectional view showing the essential section of the 12th embodiment of the projection lens system of the present invention, and the same numeral is assigned to the part which is equivalent to a part shown in FIG. 21, and explanation is omitted.

Although the first communicating opening is installed in the outer barrel 9b of the lens barrel 9 in the aforementioned 11th embodiment, the 12th embodiment, as shown in FIG. 23, has a constitution that junction protrusions 26 are installed, for example, at three locations on one of the outer barrel 9b and the bracket 11 or both of them, and the outer barrel 9b and the bracket 11 are joined at the junction protrusions 26, and a gap portion 27a is provided in the portion other than the junction protrusions 26. Therefore, this gap portion 27a functions as the first communicating opening 27 connected from the spaces between the lens elements to the outside of the projection lens system.

Figure 24:
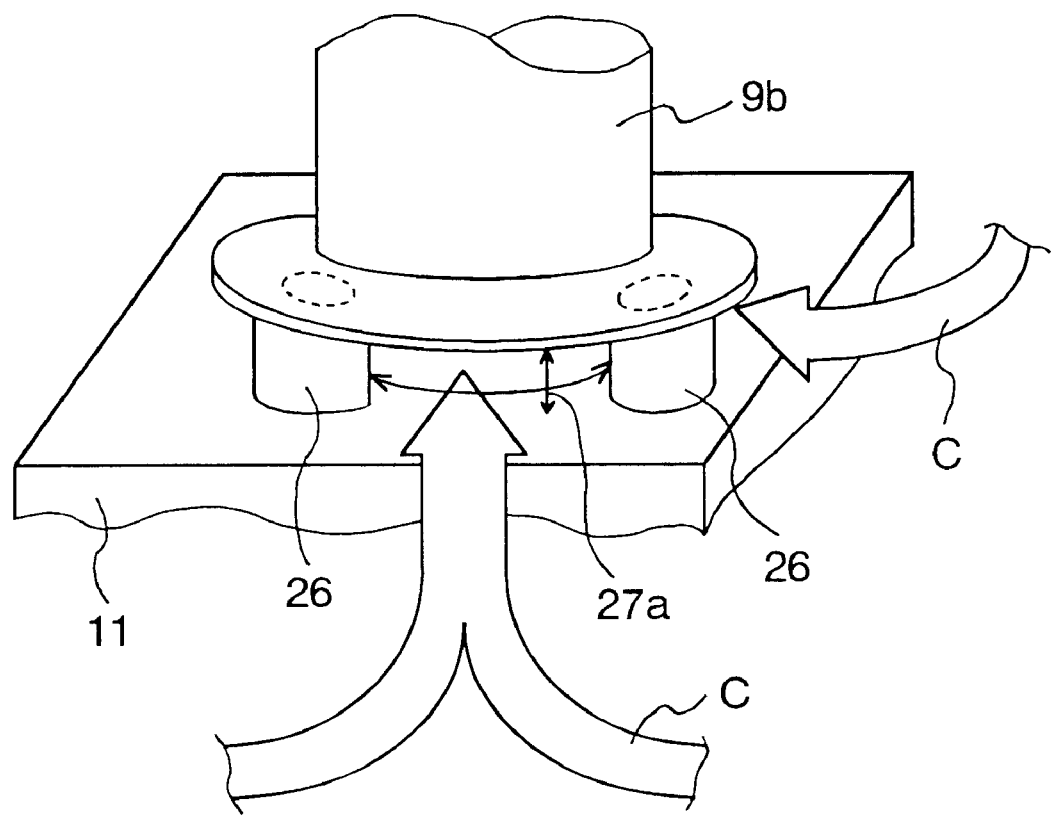
FIG. 24 is a perspective view of the essential section showing the actual constitution of the first communicating opening 27 shown in FIG. 23.

FIG. 24 is a perspective view of the essential section showing the actual constitution of the first communicating opening 27 shown in FIG. 23. In FIG. 24, the junction protrusions 26 are installed at three locations on the end face of the bracket 11 and the gap portion 27a between the junction protrusions 26 is the first communicating opening 27. The junction protrusions 26 may be installed on the flange surface at the end of the outer barrel 9b instead of the end face of the bracket 11 or may be installed on both of them and put opposite to each other free of substantial difference. In either case, the same effect as that in the 11th embodiment can be obtained.

Figure 25:
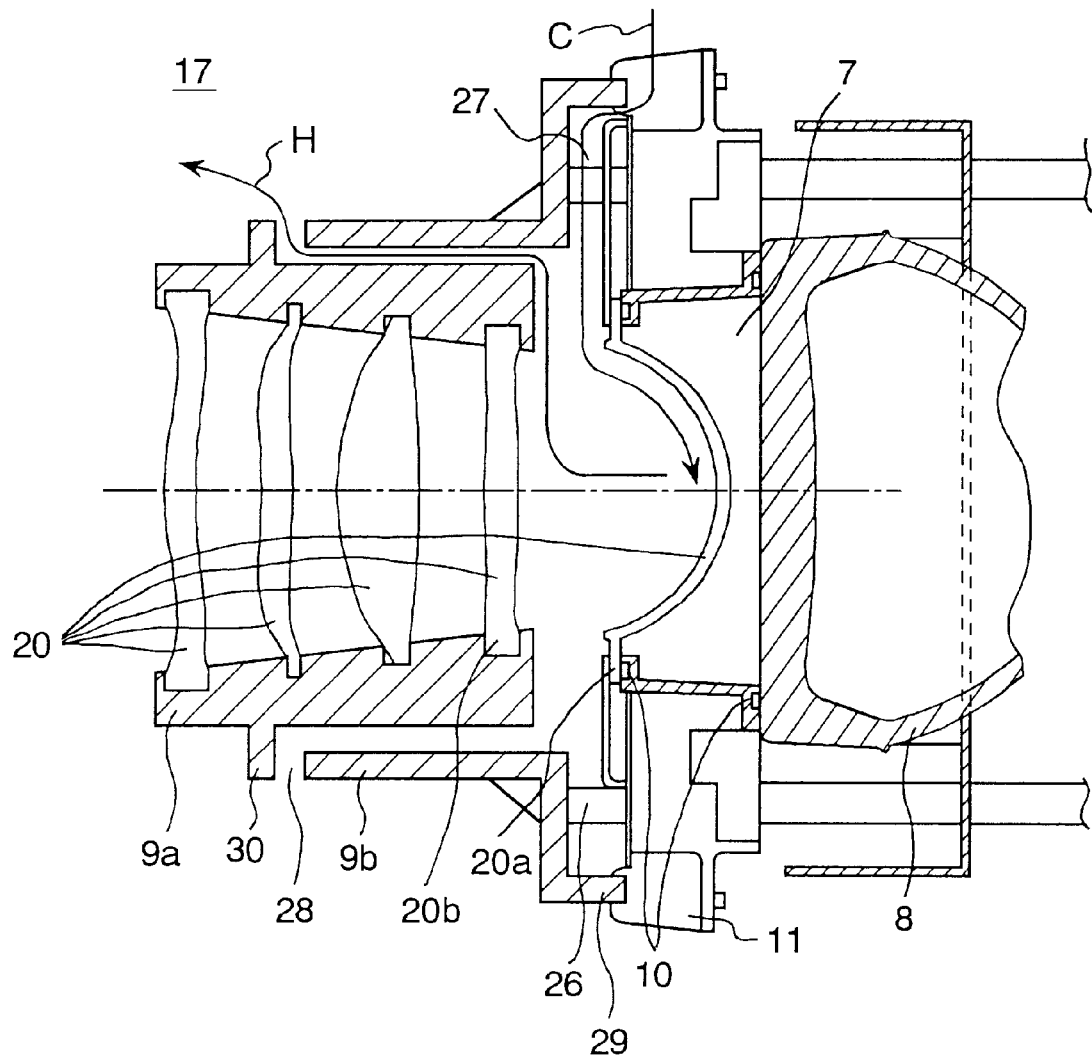
FIG. 25 is a cross sectional view showing the essential section of the 13th embodiment of the projection lens system of the present invention.

FIG. 25 is a cross sectional view showing the essential section of the 13th embodiment of the projection lens system of the present invention, and the same numeral is assigned to the part which is equivalent to a part shown in FIGS. 21 and 23, and explanation is omitted.

A difference of the 13th embodiment from the 12th embodiment is a point that in the opening portions of the first communicating opening 27 and the second communicating opening 28 toward the outside of the projection lens system, a first flange 29 and a second flange 30 are arranged as a dust-proof member respectively. In this case, assuming the communicating openings including portions along the dust-proof members 29 and 30 as a communicating opening respectively, the shape of each communicating opening itself can be regarded as a bent shape. In this embodiment, in addition to the effects obtained in the 11th and 12th embodiments, since the system has a function for preventing a foreign material and light from entering the projection lens system and light leakage from the projection lens system, the contrast performance of the projection lens system itself will not be lowered and the image contrast of a rear projection type image display apparatus using the projection lens system will neither be lowered. Even if a curved shape or twisted shape is used as a shape of communicating opening in addition to the bent shape, the same effect can be obtained.

Figure 26:
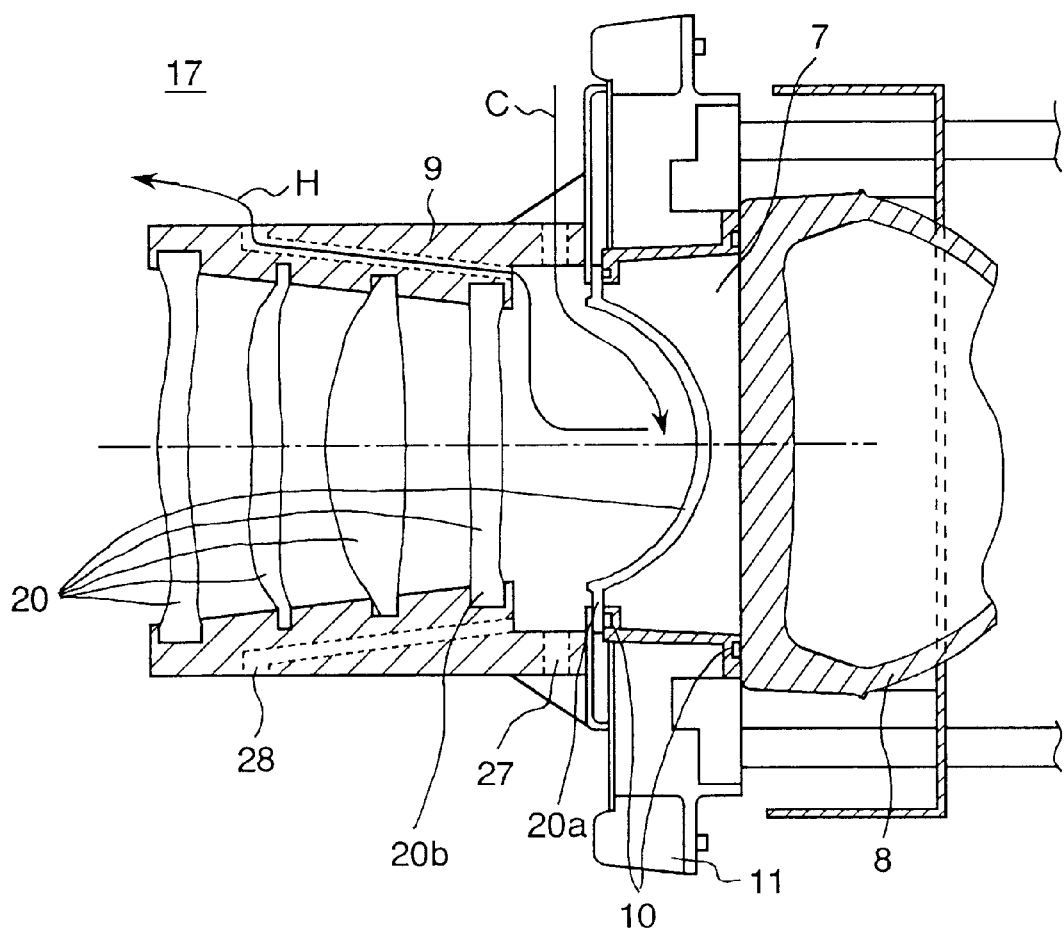
FIG. 26 is a cross sectional view showing the essential section of the 14th embodiment of the projection lens system of the present invention.

FIG. 26 is a cross sectional view showing the essential section of the 14th embodiment of the projection lens system of the present invention, and the same numeral is assigned to the part which is equivalent to a part shown in FIGS. 21, 23, and 25, and explanation is omitted.

A difference of the 14th embodiment from the 11th embodiment is a point that the lens barrel 9 is of an integrated type that it is not separated into an outer barrel and an inner barrel. In this embodiment, the second communicating opening 28 is formed as a through hole inside the wall surface of the lens barrel 9. Even if this constitution is used, the same effect as that in the 11th and 12th embodiments can be obtained. In the same way as with the 13th embodiment, when a dust-proof member (not shown in the drawing) is installed in the opening portion of the communicating opening toward the outside of the projection lens system, the same effect as that in the 13th embodiment is obtained.

Figure 27:
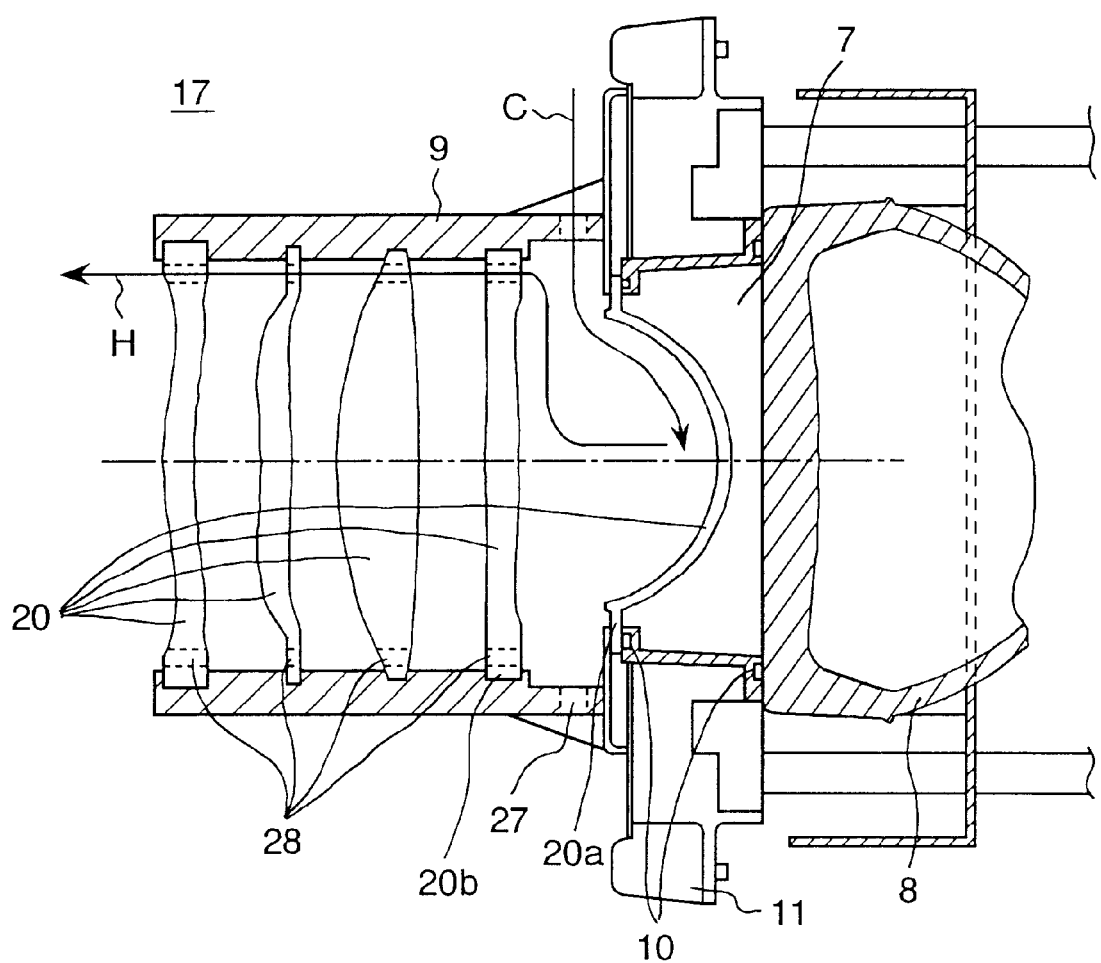
FIG. 27 is a cross sectional view showing the essential section of the 15th embodiment of the projection lens system of the present invention.

FIG. 27 is a cross sectional view showing the essential section of the 15th embodiment of the projection lens system of the present invention, and the same numeral is assigned to the part which is equivalent to a part shown in FIGS. 21, 23, 25, and 26, and explanation is omitted. A difference of the 15th embodiment from the 14th embodiment is a point that the second communicating opening 28 is formed as a through hole in the neighborhood of the periphery of each lens element instead of a through hole inside the wall surface of the lens barrel 9. Even if this constitution is used, the same effect as that in the 11th, 12th, and 14th embodiments can be obtained. In the same way as with the 13th embodiment, when a dust-proof member (not shown in the drawing) is installed in the opening portion of the communicating opening toward the outside of the projection lens system, the same effect as that in the 13th embodiment is obtained.

Next, the constitution when the projection lens system as explained in each aforementioned embodiment is used in a projection type image display apparatus will be explained.

Figure 28:
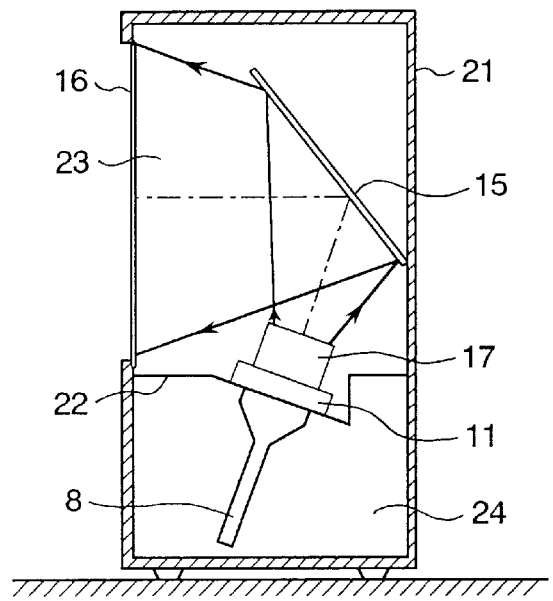
FIG. 28 is a cross sectional view showing the essential section of the longitudinal cross section of a rear projection type image display apparatus using the projection lens system of the present invention.

FIG. 28 is a cross sectional view showing the essential section of the longitudinal cross section of a rear projection type image display apparatus using the projection lens system 17 of the present invention. Numeral 15 indicates a reflecting mirror, 16 a transmission type screen, 21 a cabinet, and 22 a projection lens system holding member. The inside of the cabinet 21 is partitioned into an upper space 23 and a lower space 24 by the projection lens system holding member 22. The same numeral is assigned to the part which is equivalent to a part shown in each of FIGS. 21 to 27, and explanation is omitted.

In the rear projection type image display apparatus shown in FIG. 28, the aforementioned projection lens system 17 is held by the projection lens system holding member 22 and the lens barrel 9, each lens element therein, and the bracket 11 are arranged in the upper space 23 in the cabinet. An original image displayed on the projection type cathode ray tube 8 which is an image generating source is enlarged by the projection lens system 17, and the optical path thereof is folded by the reflecting mirror 15, and the enlarged image is projected on the transmission type screen 16.

When the projection lens system according to the lens data shown in Tables 1 to 10 which is explained previously is used as a projection lens system, a compact set can be realized as the rear projection type image display apparatus shown in FIG. 28.

Figure 29:
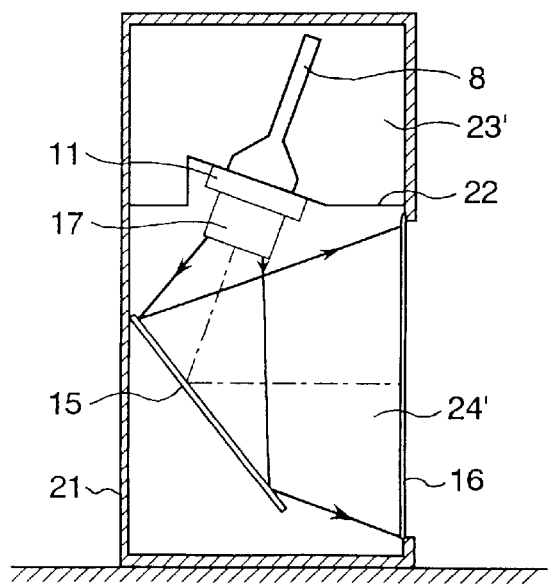
FIG. 29 is a cross sectional view showing the essential section of the longitudinal cross section of another embodiment of a rear projection type image display apparatus using the projection lens system of the present invention.

FIG. 29 is a cross sectional view showing the longitudinal cross section of a rear projection type image display apparatus when the rear projection type image display apparatus shown in FIG. 28 is structured so as to stand on end as another embodiment of a rear projection type image display apparatus using the projection lens system 17 of the present invention. Numerals 23' and 24' indicate an upper space and a lower space in the cabinet 21 respectively. The same numeral is assigned to the part which is equivalent to a part shown in FIG. 28.

Figure 30:
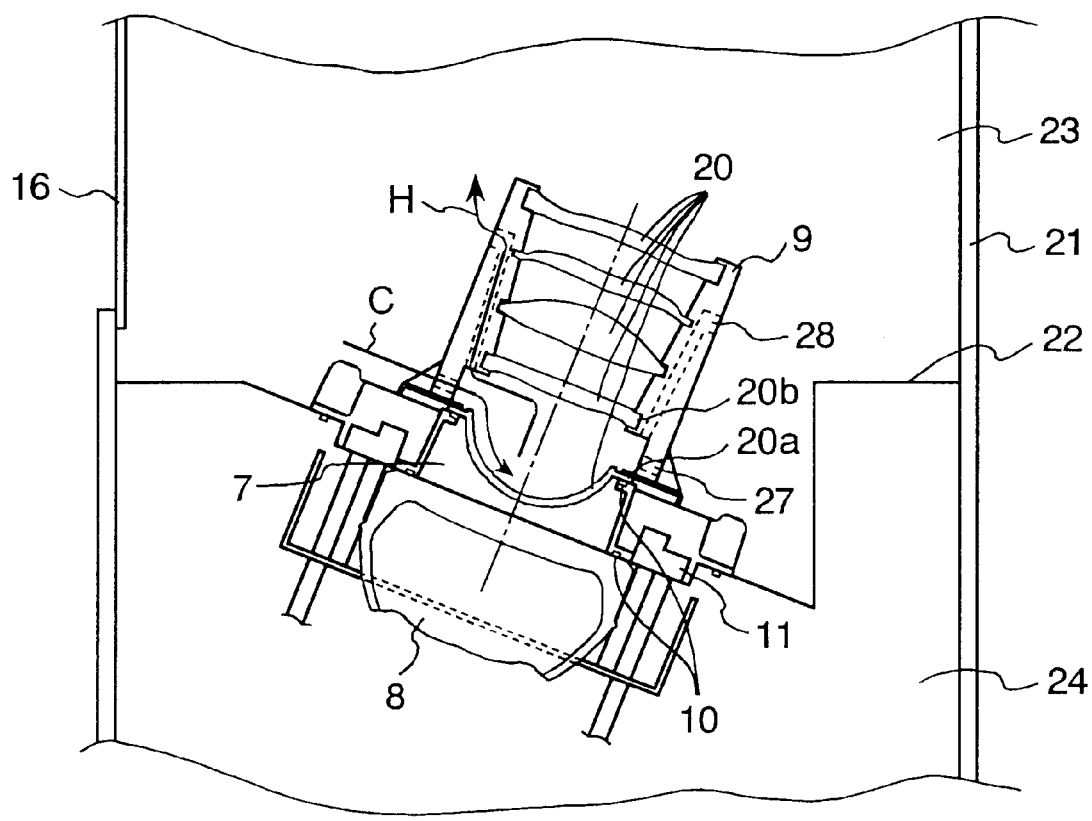
FIG. 30 is a cross sectional view showing the projection lens system of the rear projection type image display apparatus shown in FIG. 28 in detail.

FIG. 30 is a cross sectional view showing the projection lens system 17 of the rear projection type image display apparatus shown in FIG. 28 in detail.

Figure 31:
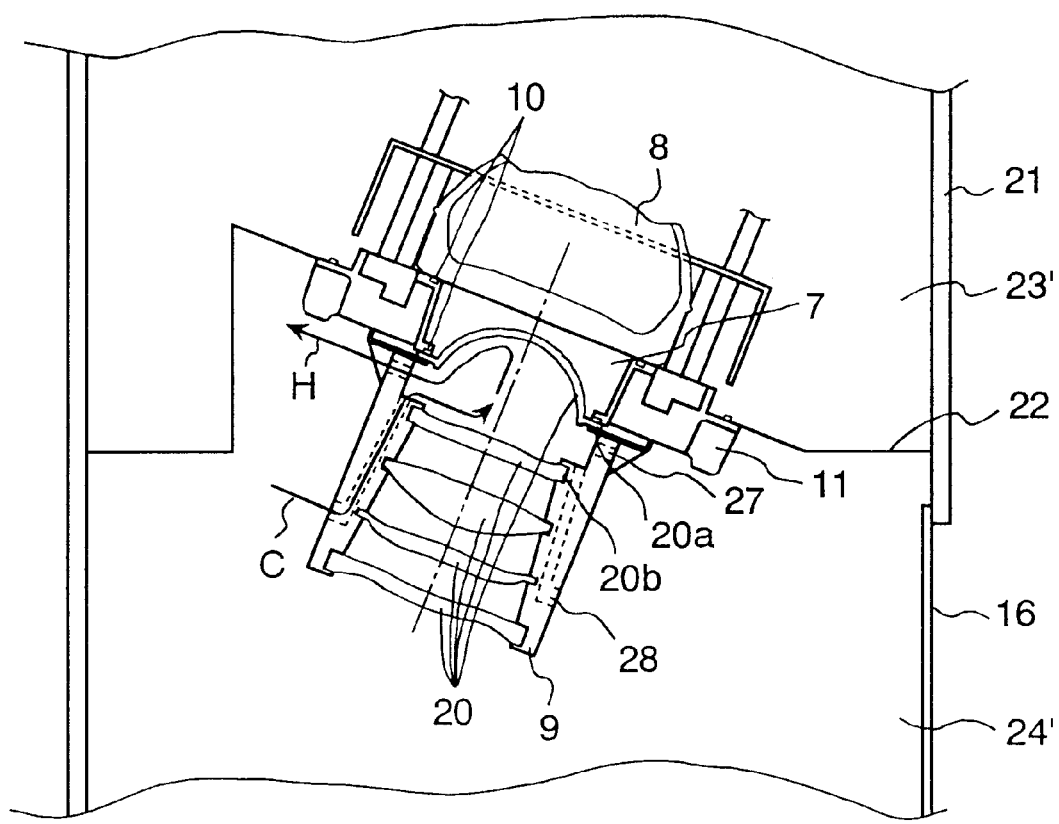
FIG. 31 is a cross sectional view showing the projection lens system of the rear projection type image display apparatus shown in FIG. 29 in detail.

FIG. 31 is a cross sectional view showing the projection lens system 17 of the rear projection type image display apparatus shown in FIG. 29 in detail.

The projection lens system 17 shown in FIGS. 30 and 31 has a constitution equivalent to that of the 14th embodiment of the aforementioned projection lens system 17.

In the projection lens system 17 shown in FIG. 30, by the heat generated by the projection type cathode ray tube 8 which is an image generating source, the lens element 20a closest to the projection type cathode ray tube 8 and the air in the space between the lens element 20a and the lens element 20b second closest to the projection type cathode ray tube 8 are heated sequentially, and the heated air H at high temperature flows out from the second communicating opening 28 formed in the lens barrel 9 into the upper space 23, and on the other hand, low-temperature air (open air) C flows in from the first communicating opening 27. Also in the projection lens system 17 shown in FIG. 31, by the heat generated by the projection type cathode ray tube 8, the lens element 20a closest to the projection type cathode ray tube 8 and the air in the space between the lens element 20a and the lens element 20b second closest to the projection type cathode ray tube 8 are heated sequentially, and the heated air H at high temperature flows out from the first communicating opening 27 into the lower space 24', and on the other hand, low-temperature air (open air) C flows in from the second communicating opening 28 formed in the lens barrel 9. By these operations, the efficiency of heat radiation from the lens elements increases, and the lens elements 20a and 20b are prevented from rising of temperature, and expansion and heat deformation are generated little, and the focus performance as a projection lens system is prevented from changing due to temperature.

The projection lens system 17 shown in FIGS. 30 and 31 may have the constitution shown in another embodiment of the projection lens system 17 and the same effect as that in the aforementioned case can be obtained. Furthermore, as shown in the 13th embodiment, when a dust-proof member (not shown in the drawing) is installed in the opening portion of each communicating opening toward the outside of the projection lens system, since the projection lens system 17 has a function for preventing a foreign material and light from entering the projection lens system and light leakage from the projection lens system, the image contrast of the rear projection type image display apparatus will not be lowered.

In the above description, the constitution that each communicating opening is arranged in the space between the lens element closest to the image generating source and the lens element second closest to it is mainly explained. However, the location of each communication opening to be arranged is not limited to it. Even if it is arranged in a space between other lens elements, the same effect can be obtained though it is inferior slightly.

Only a case that the projection type cathode ray tube is used as an image generating source is explained. However, even if a constitution that a liquid crystal panel is combined with the light source is used, since the light source becomes a heat generating source, the same effect as the aforementioned can be obtained. Furthermore, as an example of the projection type image display apparatus using the projection lens system of the present invention, a rear projection type image display apparatus is explained. However, needless to say, even a case of a front projection type image display apparatus can obtain the same effect.

The present invention obtains many good results indicated below.

(1) Since a constitution that no concave lens is arranged on the screen side of the third lens having almost all the positive refractive power of the overall projection lens system is used, even if the field angle is widened, distortion and astigmatism can be corrected and a high focus and a wide field angle are compatible with each other.

(2) Since a constitution that no concave lens is arranged between the third lens having the positive refractive power and the first lens closest to the screen side is used, the light focused in the marginal area is not diverged between them. As a result, the height of light can be lowered and a good marginal light amount ratio can be realized.

(3) Almost all the positive refractive power of the overall projection lens system is shared by the third lens and by combination of local aspherical surface profiles of the first and second lenses, the lowering of the focus performance due to changes in temperature and absorption of moisture can be reduced.

(4) When a lens having negative refractive power with the concave surface facing the screen side is installed in the location closest to the projection tube which is an image light source as a sixth lens and the lens surface of the lens on the screen side is formed as a profile that the lens refractive power in the area through which the light flux from an object in the marginal area on the fluorescent face passes is weaker than that in the neighborhood of the optical axis of the lens, the difference in length of optical path between the saggital plane and the meridional plane is made smaller. Furthermore, in a lens arranged next on the screen side to the above-mentioned lens having negative refractive power, when the profile of the lens surface on the projection tube side is convex on the projection tube side in the neighborhood of the optical axis and concave on the projection tube side in the marginal area, the above difference in length of optical path can be made more smaller and the astigmatism in the marginal area can be corrected with higher precision.

(5) The third lens is an inexpensive low dispersion glass convex lens and the cost of the overall projection lens system is reduced. To correct chromatic aberration, the fourth lens is a high dispersion plastic concave lens and used in combination with the third lens. Furthermore, a filter for cutting the spurious component other than the dominant wavelength component of the light emission spectrum of a phosphorescent substance is installed in at least one lens of the lenses constituting the projection lens system and the generated chromatic aberration itself is reduced.

(6) Furthermore, to realize a large aperture, the aforementioned fourth lens is a large dispersion plastic concave lens, and the profile thereof is formed in a profile of strong aspherical surface, and the aberration can be corrected with high precision.

The entry height of the upper ray into the third lens (glass lens) can be lowered by the aspherical surface profile of the fourth lens, so that the diameter of the third lens (glass lens) can be decreased for the same F-number and the cost can be reduced.

Furthermore, the incident angle of the upper ray into the third lens (glass lens) can be increased, so that the refractive power of the third lens 3 can be made smaller. As a result, an inexpensive glass material with a refractive index nd of 1.6 or less can be used and the cost can be reduced.

When the aforementioned projection lens system is used, a bright and high focus image can be obtained in the overall area of the screen and a compact projection type display apparatus can be realized. When the projection lens system of the present invention is applied, between the distance (projection distance) L (mm) from the top of the lens surface of the lens closest to the screen in the first lens on the screen side to the transmission type screen and the diagonal effective size M (inch) of the transmission type screen, the following relation is held:

$17.3 < (L/M) < 17.6$ and a compact set can be realized.

On the other hand, according to the present invention, when the communicating opening or communicating window explained in each aforementioned embodiment is arranged in the lens barrel of the projection lens system or others, the efficiency of heat radiation from the lens elements is increased by the convection action of air, and the lens elements are suppressed in rising of temperature, and the expansion and deformation due to rising of temperature are suppressed, and as a result, the lens performance, particularly the focus performance are prevented from lowering.

Furthermore, when a dust-proof member in a shape such as a flange is arranged in a suitable location of the opening portion of the aforementioned communicating opening or communicating window toward the outside of the projection lens (system or when the communicating opening or communicating window itself is formed in a bent, or curved, or twisted shape, entry of a foreign material or light into the projection lens system and light leakage from the inside of the projection lens system are prevented, and the contrast performance of the projection lens system itself will not be lowered, and the image contrast of a projection type image display apparatus using the projection lens system will be neither reduced.

What is claimed is:

1. A projection lens system having a plurality of lenses, for enlarging and displaying on a screen an original image displayed on an image generating source, comprising first, second, third, fourth, fifth and sixth lens groups sequentially from a screen side, wherein said first lens group includes a meniscus lens having positive refractive power, and having a convex lens surface on the screen side at a central area thereof containing an optical axis of the projection lens system and a concave lens surface on the screen side at a peripheral area thereof which is apart from the optical axis in the radial direction, wherein said second lens group includes a lens having positive refractive power, and having a concave lens surface on the screen side at a central area thereof containing the optical axis and a convex lens surface on the screen side at a peripheral area thereof which is apart from the optical axis in the radial direction, wherein said third lens group includes a lens having a positive refractive power stronger than all other lens of the projection lens system, and having convex lens surface on the both sides, wherein said fourth lens group includes a meniscus lens having negative refractive power, and having a concave lens surface on the screen side at both of a central area thereof containing an optical axis of the projection lens system and a marginal area thereof which is apart from the optical axis in the radial direction and which abuts an outer periphery of an optic surface of said fourth lens group, wherein said fifth lens group includes a lens having positive refractive power, and having a convex lens surface on an image generating source side at a central area thereof containing the optical axis, and wherein said sixth lens group includes a meniscus lens having the strongest negative refractive power among all other lenses of the projection lens system, and having a concave lens surface on the screen side.

2. A projection lens system according to claim 1, wherein said first lens group and said second lens group have the following relation of an axial distance L 12 between surfaces of the first lens group and the second lens group, to a focal length f0 of the overall projection lens system:

$(L\ 12/f0) < 0.25$.

3. A projection lens system according to claim 1, wherein said first lens group, said second lens group, and said third lens group have the following relation between an axial distance L 12 between said first lens group and said second lens group and an axial distance L 23 between said second lens group and said third lens group:

$(L\ 12/L\ 23) > 1.3$.

4. A projection lens system according to claim 1, wherein said third lens group has the following relation between a radius of curvature Ra3 of the lens surface on the screen side of said lens within the third lens group, having strongest positive refractive power among the lenses of the projection lens system and a radius of curvature Rb3 of the lens surface on the image generating source side:

|Ra3|<|Rb3|.

5. A projection lens system according to claim 1, wherein said fourth lens group has the following relation between a radius of curvature Ra4 of the lens surface on the screen side of a lens having strongest negative refractive power among the lenses of the fourth lens group and a radius of curvature Rb4 of the lens surface on the image generating source side:

|Ra4|<|Rb4|.

6. A projection lens system according to claim 5, wherein said fourth lens group uses a high dispersion material having an Abbe's number d of 45 or less as a material of said lens having strongest negative refractive power among the lenses thereof.

7. A projection lens system according to claim 5, wherein a refractive index n3 of said lens having strongest positive refractive power among the lenses of the projection lens system and a refractive index n4 of a lens closest to said third lens group among the lenses constituting said fourth lens group are substantially equal to each other.

8. A projection lens system according to claim 1, wherein a projection tube is used as said image generating source, and said sixth lens group comprises a lens having lens surfaces with the concave surface thereof facing the screen and negative refractive power, a liquid coolant for cooling said projection tube, and fluorescent face glass of said projection tube, and the center of curvature of said fluorescent face glass exists on the screen side.

9. A rear projection type image display apparatus including a projection lens system according to claim 1, disposed in front of and adjacent to said image generating source, wherein a transmission type screen is arranged on a focusing plane located in front of said projection lens system.

10. A rear projection type image display apparatus according to claim 9 wherein between a distance L (mm) from a screen side surface of a lens which is positioned closest to the screen side among the lenses of said first lens group constituting said projection lens system to said transmission type screen, and a diagonal effective size M (inch) of said transmission type screen, the following relation exists:

$$17.3<(L/M)<17.6.$$

11. A projection lens system according to claim 1, wherein:

said first lens group includes a meniscus lens having positive refractive power in which a profile of the central area thereof is convex on the screen side; and said second lens group includes a meniscus lens having positive refractive power in which a profile of a central area thereof is convex on said image generating source side.

* * * * *